United States Patent
Berheide et al.

(10) Patent No.: US 12,372,482 B2
(45) Date of Patent: Jul. 29, 2025

(54) LITHIUM DETECTION APPARATUS SYSTEMS AND METHODS

(71) Applicant: Schlumberger Technology Corporation, Sugar Land, TX (US)

(72) Inventors: Markus Berheide, Medford, MA (US); Jeffrey Miles, Arlington, MA (US); Rod William Shampine, Houston, TX (US); Dominic Vincent Perroni, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 105 days.

(21) Appl. No.: 18/324,438

(22) Filed: May 26, 2023

(65) Prior Publication Data

US 2024/0393267 A1 Nov. 28, 2024

(51) Int. Cl.
G01N 23/09 (2018.01)
(52) U.S. Cl.
CPC .................................. *G01N 23/09* (2013.01)
(58) Field of Classification Search
None
See application file for complete search history.

(56) References Cited

U.S. PATENT DOCUMENTS

| | | |
|---|---|---|
| 2,843,752 A | 7/1958 | Goodman |
| 3,379,884 A | 4/1968 | Youmans |
| 3,461,291 A | 8/1969 | Goodman |
| 4,390,783 A | 6/1983 | Grau |
| 4,721,853 A | 1/1988 | Wraight |
| 4,937,446 A | 6/1990 | McKeon |
| 5,045,693 A | 9/1991 | McKeon |
| 5,471,057 A | 11/1995 | Herron |
| 5,786,595 A | 7/1998 | Herron |
| 6,781,115 B2 | 8/2004 | Stoller |
| 8,521,435 B2 | 8/2013 | Minh |
| 9,798,037 B2 | 10/2017 | Zhou |
| 9,952,348 B2 | 4/2018 | Zhou |
| 10,061,055 B2 | 8/2018 | Grau |
| 10,247,849 B2 | 4/2019 | Pfutzner |
| 10,429,540 B2 | 10/2019 | Grau |
| 2024/0060910 A1* | 2/2024 | Sari ...................... G01N 23/025 |
| 2024/0351915 A1* | 10/2024 | Riabtsev .................. B01D 1/16 |

OTHER PUBLICATIONS

Ellis, D.V., et al., Well Logging for Earth Scientists, 2nd edition, Springer, 2007, Chapter 15, pp. 383-414.
Serra, O., Fundamentals of Well Log Interpretation, Elsevier, 1984, Chapter 9 and 10, pp. 151-193.

(Continued)

*Primary Examiner* — Hoon K Song
(74) *Attorney, Agent, or Firm* — Jeffrey D. Frantz

(57) ABSTRACT

A system includes a neutron source that emits neutrons. The system also includes a vessel that holds a lithium-containing material including a lithium-sorbent material and a lithium-containing brine. Further, the system includes a neutron detector that receives a subset of the neutrons emitted from the neutron source that are transmitted through the lithium-sorbent material and the lithium-containing brine. The neutron detector also determines a concentration of lithium based on the received subset of neutrons.

19 Claims, 12 Drawing Sheets

(56) References Cited

OTHER PUBLICATIONS

Radtke, R.J., et al., A New Capture and Inelastic Spectroscopy Tool Takes Geochemical Logging to the Next Level, LithoScanner Paper AAA, SPWLA 53rd Annual Logging Symposium, SPWLA-2012-103, Jun. 16-20, 2012.

Pemper, R., et al, A New Geochemical Logging Tool for Determination of Formation Chemistry and Mineralogy in both Conventional and Unconventional Reservoirs, the SPE Annual Technical Conference and Exhibition, SPE-191411-MS, Sep. 24, 2018.

Flaum, C. et al. Method for Extracling the Value of Thermal Capture Cross-Section From Pulsed Neutron Tool Data by Nmr-Like Inverse Laplace Transform , the SPWLA 49th Annual Logging Symposium, SPWLA-2008-K, May 25, 2008.

\* cited by examiner

LITHIUM DETECTION APPARATUS SYSTEMS AND METHODS

BACKGROUND OF THE INVENTION

The present disclosure relates generally to techniques for determining a lithium-ion concentration of a brine fluid, such as a geothermal brine, a continental brine, or an oilfield brine.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Lithium is a valuable element in energy storage. Electrical storage devices, such as batteries and supercapacitors, use lithium to mediate the storage and release of chemical potential energy as electrical current. As a demand for renewable, but non-transportable, energy sources (e.g., solar and wind energy grows), a demand for technologies to store energy generated using such sources also grows.

The mining industry employs a variety of techniques to extract lithium from minerals (e.g., hard rock mining) or lithium-containing fluid sources (e.g., brines, such as a geothermal brine, a continental brine, or an oilfield brine). However, such techniques may be relatively inefficient and/or expensive. For example, acid digestion is a technique that may be used to extract lithium from minerals obtained during hard rock mining, but this process is labor intensive. Lithium (e.g., as lithium-ion) may be extracted from salt water sources using evaporation ponds with chemical additives to selectively precipitate the lithium. Such processes may take months to complete, and yield a material containing roughly 50-60% lithium. As such, this process may involve further processing.

Certain techniques use lithium-sorbent materials to extract lithium from lithium-containing fluid sources. In general, these techniques involve the lithium-sorbent material adsorbing or binding to the lithium in a stream and subsequently washing the lithium-sorbent material (e.g., a solid adsorbent or a liquid adsorbent) to release or extract the lithium bound to the lithium-sorbent material. Lithium-sorbent materials may be very sensitive to impurities such as divalent ions, silica, and metals. Further, techniques utilizing lithium-sorbent materials may be difficult to scale, may be expensive to operate, may have a relatively low efficiency of extracting lithium, and may adversely affect the environment when used in water.

SUMMARY OF THE INVENTION

In certain embodiments, a system includes a neutron source that emits neutrons. The system may also include a vessel configured that holds a lithium-containing material, which is a mixture of lithium-sorbent material and a lithium-containing brine. The system may include neutron detector that receives a subset of the neutrons emitted from the neutron source that are transmitted through the lithium-containing material. Further, the neutron detector may determine a concentration of lithium based on the received subset of neutrons.

In certain embodiments, a method includes providing a lithium-containing brine to a vessel holding a lithium-sorbent material. The method also includes emitting neutrons into the vessel using a neutron source. Further, the method includes collecting, using a neutron detector, a subset of the emitted neutrons that traverses a collection volume of the vessel, wherein the collection volume is disposed between the neutron source and the neutron detector. Even further, the method includes determining a loading capacity of a lithium-containing material based on the collected neutrons. The lithium-containing material comprises the lithium-sorbent material and the lithium-containing brine.

In certain embodiments, a system includes an adsorption bed that receives a lithium-containing stream. The adsorption bed comprises a lithium-sorbent material configured to bind lithium-ions in the lithium-containing stream. The system also includes a lithium detection apparatus having an emission source that emits radiation. The lithium detection apparatus also includes a detector that receives a subset of the emitted radiation from the emission source that is transmitted through the lithium-sorbent material, and the radiation includes neutrons. Further, the system includes one or more detectors configured to receive a subset of the neutrons emitted from the emission source that are transmitted through the lithium-sorbent material and determine a concentration of lithium adsorbed by the lithium-sorbent material based on the received subset of neutrons. Further still, the system includes a controller comprising one or more processors configured to: receive data from the one or more detectors based on the received subset of neutrons; determine a concentration of lithium based on the data; and determine an operational adjustment of the one or more adsorption beds, the lithium detection apparatus, or both, based on the determined concentration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
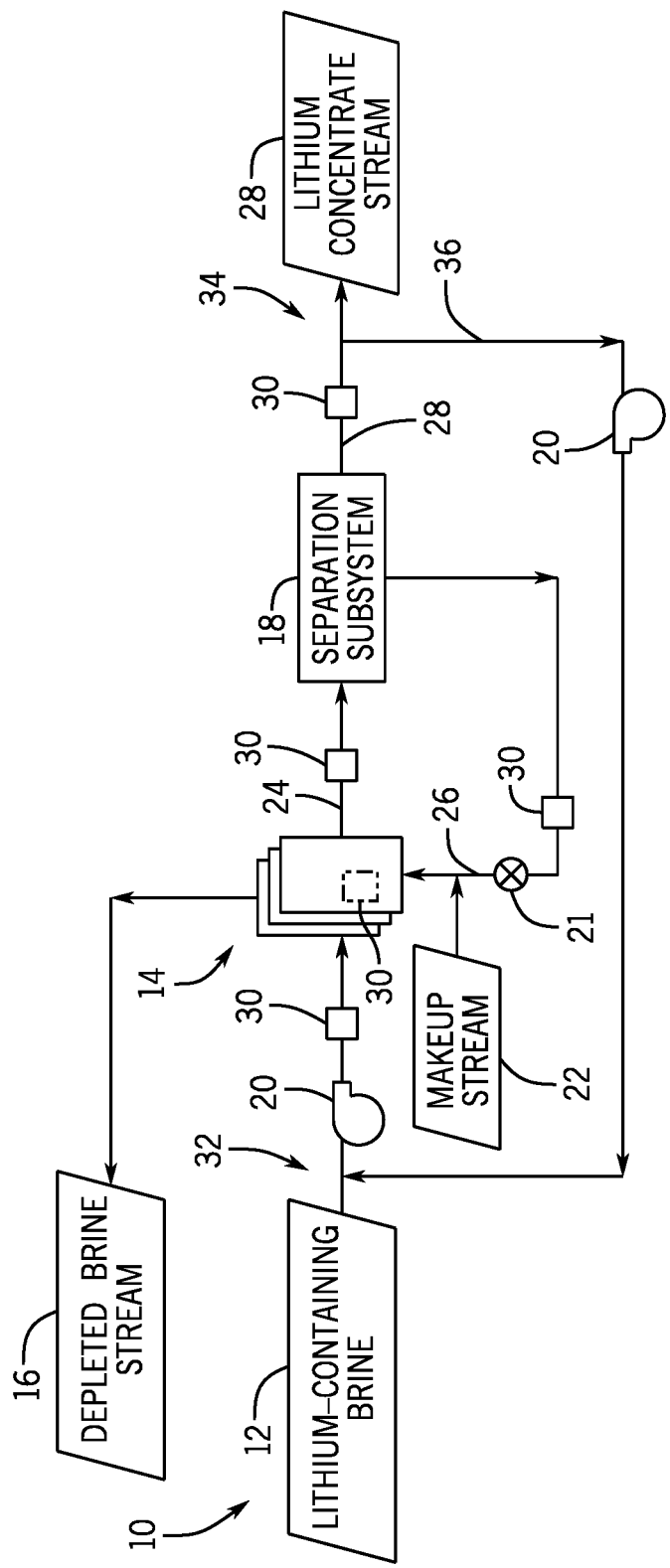
FIG. 1 is a schematic diagram of a lithium extraction system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In general, the functionality, efficiency, or loading capacity of a lithium-sorbent material may decrease over time as the lithium-sorbent material adsorbs lithium (e.g., lithium ions) from a lithium-containing source (e.g., a geothermal brine, a continental brine, an oilfield brine, seawater, a recycling fluid, or a leachate from hard rock and clay). For example, the loading capacity of the lithium-sorbent material may decrease proportionately (e.g., linearly or non-linearly) with an amount of lithium adsorbed by the lithium-sorbent material, cycles of adsorption and desorption of the lithium, and the like. A "lifetime", as referred to herein, of the lithium-sorbent material is a time period or number of cycles of use where the loading capacity, efficiency, or functionality of the lithium-sorbent material decreases from an initial loading capacity, efficiency, or functionality to a threshold loading capacity (e.g., less than 10%, less than 5%, or less than 1% of the initial loading capacity), threshold efficiency, or threshold functionality. Accordingly, it may be advantageous to monitor the use of the lithium-sorbent material to determine whether the lithium-sorbent material should be replaced or repaired. Detecting the lithium adsorbed by the lithium-sorbent material is difficult due to lithium's light weight as compared to other elements. As such, certain detectors may be insensitive to changes in lithium concentration (e.g., lithium-ion ($Li^+$) concentration), thereby preventing accurate monitoring of the lifetime of the lithium-sorbent material. Moreover, the presence of certain elements (e.g., chlorine and sulfur) in certain fluid sources, such as lithium-containing brine, may interfere, or otherwise make it difficult to detect the lithium with optical measurements. Further, certain techniques for measuring a lithium concentration may use a relatively large volume of lithium-containing brine that may not readily be accessible or suitable for certain applications. Accordingly, it is presently recognized that it may be advantageous to perform measurements of neutrons and/or gamma-ray spectroscopy on the lithium-containing brine and/or the lithium-sorbent material in a lithium detection apparatus to improve the accuracy and improve the efficiency of lithium extraction processes. Further, the processes may provide neutron-based detection that is uphole (e.g., not downhole).

The present disclosure is directed to techniques for improving the extraction of and/or measuring the amount of lithium (i.e., a lithium-ion concentration) present in a lithium-containing brine using a lithium detection apparatus that utilizes neutron and/or gamma-ray spectroscopy. The disclosed techniques may improve the accuracy of measurements for a relatively broad range of lithium concentrations (e.g., between approximately 1 ppm and 30,000 ppm, 1 ppm to 2000 ppm, 1 ppm to 10,000 ppm, or 1 ppm to saturation) in a relatively low volume. In general, the techniques may include a lithium detection apparatus having a radiation source (e.g., a neutron source or a neutron and gamma-ray source) and one or more detectors (e.g., a neutron detector and/or gamma-ray detector) arranged in suitable positions to obtain a transmission or absorption measurement in solids and/or liquids that contain lithium. In some embodiments, the lithium detection apparatus may include a vessel that holds a lithium-sorbent material arranged in between the neutron source and the one or more detectors. At least in some instances, it may be difficult to distinguish the lithium in the lithium-containing brine from the lithium adsorbed to the lithium-sorbent material. As such, the lithium detection apparatus may be arranged to provide a variable path length and/or variable intensity of the neutron source for the transmission measurement. In some embodiments, the lithium detection apparatus techniques may be used to monitor a lithium concentration during different time periods of a lithium-sorbent material loading process (e.g., media lithium processing), which may aid an operator to determine breakthrough during one or more lithium-sorbent loading and/or unloading cycles. As such, the loading capacity of the lithium-sorbent material may be more accurately determined using the disclosed techniques. Further, the determined lithium-ion concentration may be used to adjust or modify a lithium extraction system utilizing lithium-sorbent material loading process, such as by adjusting flow rates and/or temperatures to improve the efficiency of capturing the lithium with the lithium-sorbent material. Further still, the techniques may aid operators in determining when the loading capacity of the lithium-sorbent material is below a threshold loading capacity or the lithium-sorbent material should receive maintenance and/or be replaced.

As used herein, "unload" or "unloading" the adsorption beds and/or lithium-sorbent material generally refers to extracting, removing, or otherwise purging lithium from the lithium-sorbent material via a fluid flow. As used herein, "loading" the adsorption beds and/or the lithium-sorbent material generally refers to providing a fluid flow (e.g., a lithium-containing brine stream) to the lithium-sorbent material that has a suitable loading capacity such that the lithium-sorbent material may bind the lithium. As referred to herein, "unloading" is extracting or removing the lithium adsorbed by the adsorption beds. As used herein, a "loading capacity" refers to an amount of lithium adsorbed or otherwise bound to the lithium-sorbent material. For example, a loading capacity of 0% or 0 refers to a lithium-sorbent material is that is bound to substantially no extractable lithium.

With the foregoing in mind, FIG. 1 is a schematic diagram of lithium extraction system 10 for extracting lithium (e.g., $Li^+$) from a lithium-containing brine stream 12. In general operation, the lithium extraction system 10 operates to load a medium (e.g., a lithium-sorbent material) with lithium from a source fluid (e.g., the lithium-containing brine stream 12). Then, the depleted fluid is displaced and an unloading fluid is provided to the medium. The unloading fluid extracts or unloads the media to a minimum lithium content. Then, the fluid may be again changed, and the process may be repeated one or more times. In some embodiments, the lithium-containing brine stream 12 may be a geothermal brine, a continental brine, an oilfield brine, seawater, a recycling fluid, or a leachate from hard rock and clay. As shown, the lithium extraction system 10 includes adsorption beds 14. The adsorption beds 14 may include a lithium selective adsorbent material that adsorbs lithium within the lithium-containing brine stream 12, thereby generating a depleted brine stream 16. In some embodiments, the depleted brine stream 16 may be directed into a reservoir (e.g., subterranean reservoir) or a liquid storage vessel. In some embodiments, the depleted brine stream 16 may be used as a makeup stream in the lithium extraction system 10 to account volume loss in the lithium extraction system 10 as described herein.

Further, the lithium extraction system 10 includes a separation subsystem 18, pumps 20, and valves 21. In general, the adsorption beds 14, the separation subsystem 18, and the pumps 20 may operate to remove lithium-ions (e.g., $Li^+$) from the lithium-containing brine stream 12 and produce a lithium concentration stream.

In operation, the separation subsystem 18 receives a lithium stream 24 from the one or more adsorption beds 14. The lithium stream 24 may be produced using a stripping solution. For example, the separation subsystem may output a stripping solution 26 from a previously cycle. The stripping solution 26 generally extracts the lithium from the material in the adsorption beds 14, thereby generating the lithium stream 24. In general, the stripping solution 26 contains a relatively low concentration of dissolved salts, such as lithium chloride (e.g., between approximately 0 mg/kg to 300 mg/kg of lithium). In some embodiments, a makeup stream 22 may be added to offset any volume loss of the stripping solution 26 or otherwise when the volume of stripping solution 26 is relatively low. In some embodiments, the separation subsystem 18 may include one or more filtration units (e.g., osmosis and/or nano-filtration membranes) to filter the lithium (i.e., lithium ions) from the lithium stream 24 and generate a lithium concentration stream 28. In some embodiments, the separation subsystem 18 includes one or more liquid storage vessels to store produced liquid in between wash cycles within the adsorption beds 14.

The separation subsystem 18 filters the lithium ions from the lithium stream 24, thereby generating a lithium concentrate stream 28. At least in some instances, the lithium concentrate stream 28 may be redirected to the inlet 32 for further lithium extraction and/or directed to the separation subsystem 18 (e.g., via activating a pump 20 and/or adjusting a position of a valve 21) or collected and/or further concentrated at the outlet 34.

In general, the pump(s) 20 and the valve(s) 21 may control (e.g., via a controller) the flow of fluids (e.g., the lithium-containing brine stream 12, the depleted brine stream 16, the makeup stream 22, the stripping solution 26, the lithium stream 24, the lithium concentrate stream 28, and other lithium-containing streams produced during operation of the lithium-extraction system 10) through the lithium extraction system 10. As shown, the valves 21 may be disposed in suitable positions to control the flow of fluids through and/or out of the adsorption beds 14 and/or the separation subsystem 18, flow of the lithium-containing brine stream 12 into the lithium extraction system 10, and other suitable positions for adjusting the flow of fluids. It should be noted that the positions of the valves 21 shown in FIG. 1 is non-limiting and that the lithium extraction system 10 include more or fewer valves.

The illustrated embodiment of the lithium extraction system 10 includes lithium detection apparatuses 30. The lithium detection apparatuses generally include one or more radiation detectors and one or more radiation sources capable of detecting lithium present in the lithium-containing brine stream 12 and/or the subsequently produced streams (e.g., the lithium stream 24). As described in more detail in FIG. 2, the radiation detectors and/or radiation sources may be utilized for neutron attenuation measurements (e.g., neutron counting), neutron spectroscopy, gamma-ray spectroscopy, or combinations of these measurements. As shown, the lithium detection apparatuses 30 may be disposed in different positions within the lithium extraction system 10. For example, the lithium detection apparatus 30 may be positioned upstream of one or more adsorption beds 14, downstream of one or more adsorption beds 14, upstream of the separation subsystem 18, downstream of the separation subsystem 18, or within one or more of the adsorption beds 14. For example, the lithium detection apparatus 30 may be positioned at or near an inlet 32 of the lithium extraction system 10 such that the lithium detection apparatus 30 may detect a concentration of lithium-ions within the lithium-containing brine stream 12 before it interacts with any of the adsorption beds 14. Additionally or alternatively, the lithium detection apparatus 30 may be positioned at or near an outlet 34 of the lithium extraction system 10 such that the lithium detection apparatus 30 may detect a concentration of lithium-ions extracted by the adsorption beds 14 of the lithium extraction system 10. In this way, the measurements obtained by the lithium detection apparatuses 30 may be used to determine a lithium-ion recovery rate of the lithium extraction system 10.

The lithium extraction system 10 described in FIG. 1 may be used for different applications where it may be advantageous to determine a lithium concentration. For example, the lithium extraction system 10 may be used in-line in a chemical processing plant where the measurement (i.e., lithium concentration obtained by the lithium detection apparatus 30) is used to implement process control. For example, the lithium extraction system 10 may be used in-line in a chemical processing plant where the measurement is used to evaluate the loading capacity of a lithium-sorbent material (e.g., Direct Lithium Extraction (DLE) media) while in use or to monitor the degradation of loading capacity over a period of time. It is presently recognized that these examples may improve the efficiency of fluid extraction/purification processes. Further, the examples may provide insight into an operating expense (OpEx) and capital expenditure (CapEx) intensive process.

In some embodiments, a lithium extraction fluid (e.g., non-neutral pH water or low total dissolved solids water) may be cycled through the adsorption beds 14 to remove or otherwise extract the lithium from the adsorption beds 14. In such embodiments, wash and/or purge cycles of the adsorption beds 14 may be performed simultaneously divided across all the adsorption beds 14 in the system (e.g., evenly divided or not evenly divided). In some embodiments, a controller (e.g., as described in FIG. 2) may be used to adjust the time that each set of columns is performing one of the stages. As used herein, the "cycle time" refers to a time period during which an adsorption bed 14 receives a flow of liquid to unload or load the adsorption beds 14. A "cycle" refers to a process of directing fluid to and/or from a component (e.g., an adsorption bed 14). At least in some instances, each of the stages may utilize a particular parameter set, including a combination of fluid composition, flow rate, and temperature. Each parameter set may be tunable and controlled by a suitable controller by adjusting a pumping speed of the pumps 20, opening or closing (e.g., partially or completely) the valves 21, and so on.

In some embodiments, fluids may be directed to different components of the lithium extraction system 10 in different stages. For example, a first stage, or stage 1, may correspond to when the lithium-containing brine stream 12. Further, a second stage, or stage 2, may correspond to when the depleted brine stream 16 is directed from the adsorption beds. In any case, it is presently recognized that measurements (e.g., lithium concentration measurements) during the stages may be used to monitor the fluids and lithium-sorbent material. For example, measurements during the loading time in stage 1 may be used to understand the loading behavior over time and detect breakthrough during the loading process. Further, measurements during stages 2 and 4 may be used to separate the signals due to the fluid contaminants or to the extraction fluid from that of the media. Further still, measurements during stage 3 provide information on the unloading behavior and breakthrough of the unloading process. It should be noted that comparisons of the lithium concentration measurements in stages 2 and 4 may yield a direct measurement of the loading capacity of the lithium-sorbent material 108. Such measurements may inform both process control (e.g., to increase or maximize lithium flux) and/or to determine a lithium-sorbent material 108 replacement or regeneration schedule. Further the measurements may be used in true moving bed systems and for systems where a few (2-4) adsorption beds 14 are used in a classical ion exchange configuration. In some embodiments, each stage may be repeated by directing a recycle stream 36 that includes lithium back towards the inlet 32.

It is presently recognized that each stage may change a state of the fluids or lithium-sorbent material. A "state" refers to a condition of one or more fluids (e.g., the depleted brine stream 16) and/or the lithium-sorbent material, such as a composition of material and/or amount of adsorbed material. The states may include a loading state, a loaded state, a strip initiation state, a strip finish state, and one or more transitions to loading states (e.g., pre-loading and post strip). It is presently recognized that measurements during each state may be used to determine an amount of lithium adsorbed by the lithium-sorbent material. The relative amounts of lithium media (e.g., sorbent material) content, fluid lithium content (e.g., lithium in a lithium-containing brine) and a fluid impurity content are generally shown in Table 1. In some embodiments, "low" refers to a concentration of lithium between 0 to 100 mg/L, "medium" refers to between 100 to 1000 mg/L, and "high" refers to greater than 1000 mg/L (e.g., between 1000 to 10,000, or greater than 10,000).

TABLE 1

Example states during operation of the lithium extraction system.

| State | Media Lithium Content | Fluid Lithium Content | Fluid Impurity Content |
|---|---|---|---|
| Loading state | Low | Moderate | High |
| Loaded state | High | Low | High |
| Strip initiation | High | Low | Low |
| Strip finish | Low | High | Low |
| Transition to loading A | Low | Low | Low |
| Transition to loading B | Low | Low | High |

One or more lithium detection apparatuses 30 may be disposed in one or more of adsorption bed 14 such that the zone of investigation (e.g., a volume corresponding to the lithium-concentration measurements) incorporates a significant volume of the lithium-sorbent material. In some embodiments, two or more detectors may be used to provide multiple ratios of media to container (e.g., adsorption bed 14 or vessel 102) in the measurement. Further, a zone (e.g., a portion of the volume 110) with no media (e.g., a passive volume) but with representative fluid (e.g., fluid containing lithium) may be positioned for measurement to allow the separation of the media signal from the liquid signal. Such a measurement may be done with a separate radiation source 104 and radiation detector 106 operating across a pipe leading into an adsorption bed 14, thereby exploiting the filtering abilities of the adsorption bed 14.

In some embodiments, a measurement may correspond to a measured concentration of a mixture of lithium-sorbent material and a lithium-containing brine in the vessel 102. At least in some instances, the measurement may be compared with a separate measurement of the lithium-containing brine to derive the loading capacity of the lithium-sorbent material in the vessel 102. In this case, the separate measurement refers to a measurement outside of the vessel 102, such as an in inlet of a tank or other position described with respect to FIG. 1. In some embodiments, the separate measurement may be another nuclear measurement or a different type of measurement (e.g., a chemical measurement).

Figure 2:
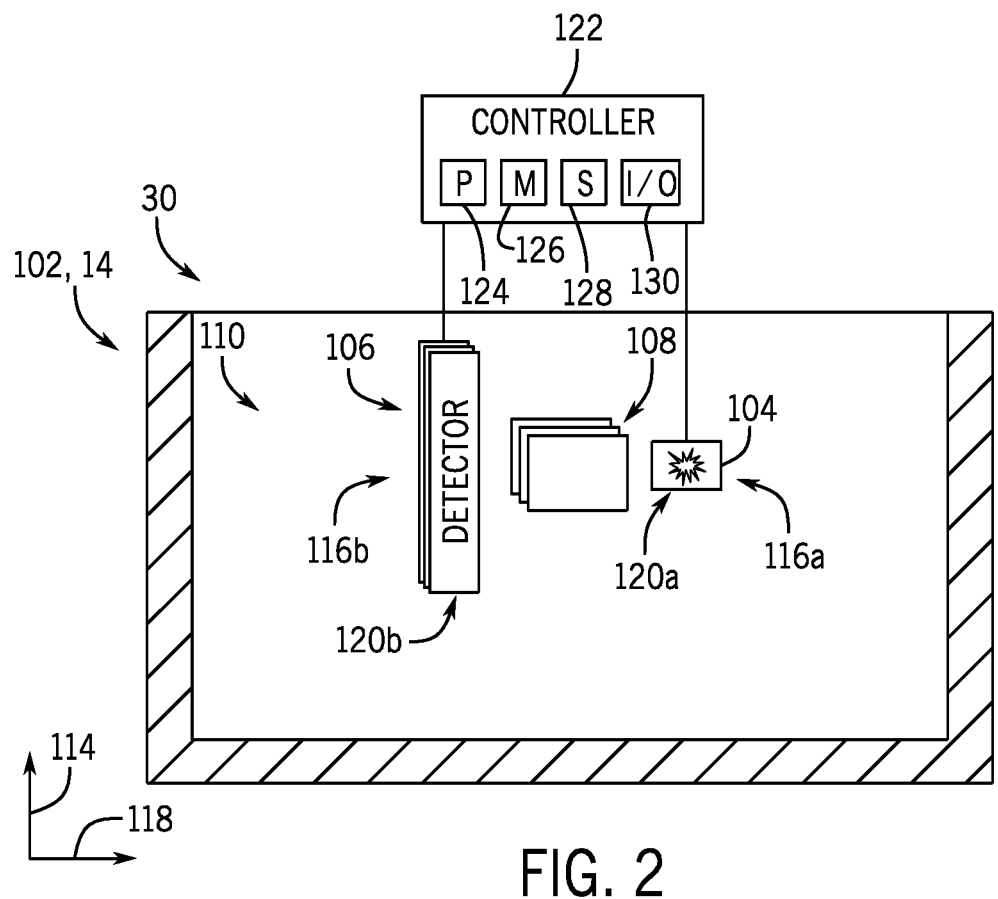
FIG. 2 is a schematic diagram of a lithium detection apparatus that may be included as part of the lithium extraction system of FIG. 1, in accordance with an aspect of the present disclosure.

As described herein, it may be advantageous to monitor the concentration of lithium using the lithium detection apparatus 30. The lithium detection apparatus 30 may utilize neutron spectroscopy to determine an amount of lithium (e.g., relative or absolute) within a lithium brine from a lithium source (e.g., a brine from a subsurface reservoir). FIG. 2 illustrates an example of the lithium detection apparatus 30. As shown, the lithium detection apparatus 30 includes a vessel 102 holding a radiation source 104 (e.g., emission sources), one or more radiation detectors 106 (e.g., neutron or gamma radiation detectors), and a lithium-sorbent material 108. In some embodiments, the vessel 102 may be the adsorption bed 14. As described above, the lithium detection apparatus 30 may be part of the lithium extraction system 10 and disposed in one or more positions within the extraction system 10 (e.g., at an inlet 32, an outlet 34, one or more intervening positions, and so on). In some embodiments, the lithium detection apparatus 30 may be used in fluid system that is uphole.

In some embodiments, the radiation source 104 may be a neutron source capable of emitting neutrons. As such, the radiation source 104 and the one or more radiation detectors 106 may be utilized for neutron attenuation measurements and/or neutron-induced gamma-ray spectroscopy of the lithium-containing brine 12 and other streams produced by the lithium extraction system 10. In some embodiments, the radiation detectors 106 may include neutron detectors and the radiation source 104 may include a neutron source. In some embodiments, the radiation detectors 106 may include gamma radiation detectors and the radiation source 104 may include a gamma radiation source (e.g. an Americium Beryllium source that emits neutrons and gamma rays). In some embodiments, the radiation detectors 106 may include a combination of gamma radiation detectors and neutron detectors. Further, the radiation sources 104 may include a combination of neutron radiation sources and gamma radiation sources. Accordingly, it is presently recognized that it may be advantageous to utilize complementary techniques that may aid in removing signals from other elements that may interfere with determining the lithium concentration (e.g. a neutron-gamma spectroscopy measurement on chlorine).

In general, the one or more radiation detectors 106 may acquire, measure, or otherwise obtain a count rate indicative of a lithium concentration (e.g., lithium-ion concentration) within the volume 110 of the lithium detection apparatus 30 and/or lithium-sorbent material 108. The volume 110 may be at least partially filled with a solid (e.g., the lithium-sorbent material 108) and/or liquid (e.g., a lithium-containing solution based on the lithium-containing brine stream 12). In some embodiments, the lithium concentration may be determined using the count rate from one or multiple of the one or more radiation detectors 106, whether fixed or movable. The gamma-ray spectroscopy may include, but is not limited to, inelastic, capture, or delayed activation gamma-ray spectroscopy. For example, the gamma-ray spectroscopy may include any suitable neutron-induced gamma-ray spectroscopies. The radiation source 104 may be any suitable neutron source, such as a chemical source or an electronic source. In embodiments where the radiation source 104 is an electronic source, the radiation source 104 may be a pulsed neutron generator. In embodiments where the radiation source 104 is a chemical source, the radiation source 104 may be an Americium-Beryllium (AmBe) source or Californium (Cf)-252 source. In some embodiments, the one or more radiation detectors 106 are proportional detectors. In some embodiments, the one or more radiation detectors 106 are scintillator detectors.

In some embodiments, the vessel 102 is an adsorption bed 14 with physical boundaries (e.g., a processing tank) that enclose a volume that holds the lithium-sorbent material 108. In general, the vessel 102 may hold a lithium-containing material, such as a lithium containing brine, the sorbent material, or both. In some embodiments, the volume fraction of the lithium-containing brine to the total volume of lithium-containing material within the vessel may be between 0% to 100%. For example, the vessel 102 may only hold the lithium-containing material, and as such, the volume fraction of the lithium-containing brine is 0%. In some embodiments, the volume fraction of the lithium-containing brine may be 10%, 20%, 30%, 40%, 50%, and so on.

In some embodiments, the vessel 102 encloses the active volume(s) but may include additional volume that does not directly affect the measurement (i.e., a passive volume). One non-limiting example is a processing tank in a chemical plant. Another example is a holding tank at a mining site. A third example is a vessel containing a solid material or sorbent. In some embodiments, the vessel 102 may include the radiation detectors 106 and the radiation source 104, but not include a lithium-sorbent material 108.

As shown, the radiation source 104 and the one or more radiation detectors 106 are arranged within the volume 110 of the vessel 102. However, it should be noted that the radiation source 104 and the one or more radiation detectors 106 may be arranged in any suitable locations within, on, or attached to the vessel 102. For example, the radiation source 104 and/or the one or more radiation detectors 106 may be disposed on one or more walls 112 (e.g., an interior surface and/or an exterior surface) of the vessel 102. As shown in the illustrated embodiment, the radiation source 104 and the one or more radiation detectors 106 are separate from the lithium-sorbent material 108. In some embodiments, the radiation source 104 and/or the one or more radiation detectors 106 may disposed within, or otherwise coupled to the lithium-sorbent material 108.

As shown, the radiation source 104 and the one or more radiation detectors 106 are arranged along a lateral axis 114 of the lithium detection apparatus 30 (e.g., within the vessel 102). For example, the radiation source 104 is at a first lateral position 116a along the lateral axis 114, and the one or more radiation detectors 106 is at a second lateral position 116b (e.g., different than the first lateral position 116a) along the lateral axis 114. However, the one or more radiation detectors 106 and the radiation source 104 may be arranged in any suitable position within or outside of the vessel 102. As shown, the radiation source 104 and the one or more radiation detectors 106 are arranged along the longitudinal axis 118 of the vessel 102. For example, the radiation source 104 may be at a first longitudinal position 120a along the lateral axis 114, and the one or more radiation detectors 106 is at a second longitudinal position 120b (e.g., different than the first longitudinal position 120a) along the longitudinal axis 118. However, it should be noted that the radiation source 104 and the one or more radiation detectors 106 may be arranged in other suitable positions along the longitudinal axis 118 of the vessel 102. In embodiments where the lithium detection apparatus 30 includes multiple radiation detectors 106 and/or multiple radiation sources 104, each radiation detector 106 and/or radiation source 104 may be arranged at different lateral positions 116 and/or different longitudinal positions 120. As illustrated, the shape of the vessel 102 is substantially rectangular or box shape. However, it should be noted that the shape of the vessel 102 may be any suitable shape. For example, the shape of the vessel 102 may have a substantially column-like shape. As such, the neutron source and the radiation detector 106 may be arranged along the length (e.g., the longest dimension) of the column. In some embodiments, where the radiation source 104 and/or the radiation detector 106 may be rotatable, pivotable, or otherwise moveable. As such, position of the neutron source and detector may be varied over the length of the vessel 102.

In some embodiments, the radiation source 104 and/or the one or more radiation detectors 106 may be fixed. Alternatively, in some embodiments, the radiation source 104 and/or the one or more radiation detectors 106 may be coupled to movable features, pivotable features, rotatable features, joints, and the other features that enable movement of the radiation source 104 and/or the one or more radiation detectors 106 to move between multiple positions. For example, in one embodiment, the radiation detector 106 may be in a fixed position and the radiation source 104 may be coupled to pivotable feature that enables the radiation source 104 to pivot between multiple fixed positions. As such, the lithium-ion concentration may be determined using the count rate at the radiation detector 106 and the radiation source 104 at each of the fixed positions.

The lithium-sorbent material 108 is generally a material that selectively or preferentially binds to lithium-ion or lithium-ion containing species. In some embodiments, the media used may be an inorganic metal oxide, polymer, or combination of the two. For example, the lithium-sorbent material 108 may include aluminum hydroxide, manganese-oxide, certain ceramic materials, or a combination thereof. The lithium-sorbent material 108 may chemically or osmotically bind to the lithium-sorbent material 108. The media may degrade via many mechanisms both chemical and physical leading to a measurable deterioration in performance. Accordingly, it may be advantageous to monitor the lifetime of the lithium-sorbent material 108 based on an amount of lithium adsorbed by the lithium-sorbent material 108 and/or a number of cycles (e.g., loading and unloading cycles) subjected to the lithium-sorbent material 108.

The measurements obtained by the one or more radiation detectors 106 and/or operation of the radiation sources 104 may be received by a controller 122 to adjust, modify, or otherwise control operations of the lithium detection apparatus 30 and/or lithium extraction system 10. As illustrated, the controller 122 includes a processor 124, memory 126, storage 128, and an input/output (I/O) port 130.

The processor 124 (e.g., processing circuitry) may be any type of computer processor or microprocessor capable of executing computer-executable code. While only one processor 124 is shown, in some embodiments, the controller may include multiple processors 125 that may perform the operations described herein. The memory 126 (e.g., memory circuitry) and the storage 128 may be any suitable articles of manufacture that can serve as media to store processor-executable code, data, or the like. These articles of manufacture may represent computer-readable media (e.g., any suitable form of memory or storage) that may store the processor-executable code used by the one or more processors of the processor 124 to perform the presently disclosed techniques. As used herein, applications may include any suitable computer software or program that may be installed onto the controller 122 and executed by the processor 124. The memory 126 and the storage 128 may represent non-transitory computer-readable media (e.g., any suitable form of memory or storage) that may store the processor-executable code used by the processor 124 to perform various techniques described herein. It should be noted that non-transitory merely indicates that the media is tangible and not a signal. The I/O ports 130 may be interfaces that may couple to other peripheral components such as input devices (e.g., keyboard, mouse), detectors, input/output (I/O) modules, and the like.

As described above, the radiation source 104 and the one or more radiation detectors 106 may be arranged in any suitable locations within, on, or attached to the vessel 102. Several example arrangements are illustrated in FIGS. 3-8. Each of the example lithium detection apparatuses 30 may provide techniques for uphole detection of lithium within a fluid source. Further, it should be noted that FIGS. 3-8 do not show the lithium-sorbent material 108 for simplicity. However, the lithium-sorbent material 108 may be present in suitable locations, areas, or regions within the volume 110 of the vessel 102. For example, the lithium-sorbent material 108 may be disposed between the radiation source(s) 104 and the radiation detector(s) 106, coupled to the radiation source(s) 104 and the radiation detector(s) 106, disposed on the walls 112 of the vessel 102, or a combination thereof.

Figure 3:
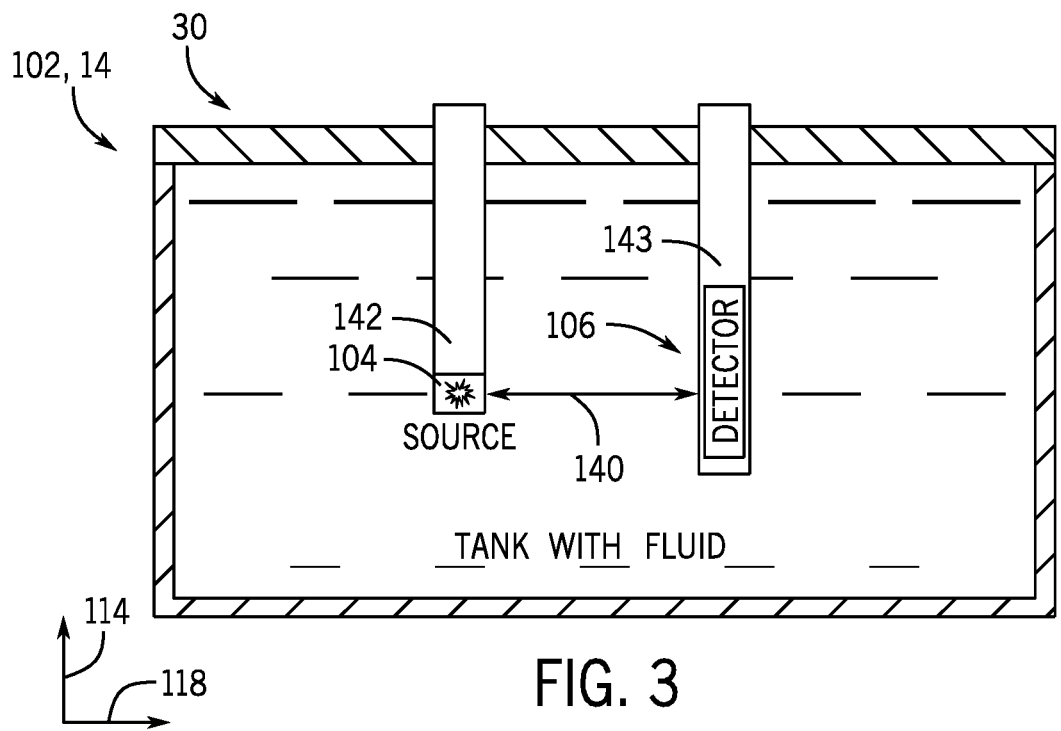
FIG. 3 is a schematic diagram of a first example of the lithium detection apparatus of FIG. 2, in accordance with an aspect of the present disclosure.

FIG. 3 shows a schematic diagram of the lithium detection apparatus 30 that includes the radiation source 104 and the radiation detector 106 disposed within the vessel 102. In some embodiments, the vessel 102 may be the adsorption bed 14. As illustrated, the radiation source 104 and the radiation detector 106 are separated by a distance 140. The distance 140 may be any suitable distance for measuring the lithium concentration. For example, the distance 140 may be a suitable distance to permit accurate measurements based on a time scale for the measurements and/or cycle time. For example, each count corresponds to the detection of a neutron arriving at the radiation detector 106. To obtain accurate measurements, it may be useful to obtain a relatively large number of counts (e.g., greater than 10,000). In one embodiment, a cycle time or loading time may be approximately 3 hours, and each measurement may occur on a relatively faster time scale (e.g., 3-minutes). As such, it may be useful to select a detector type and detector size that produces a suitable number of counts during the cycle time. One embodiment may use helium-3 detectors and the efficiency of detection may be increased by raising the pressure of the helium-3 gas in the detector. Within the constraints of the geometry and the measurement setup, the count rate can also be increased by bringing the detector closer to the source. As described herein, the lithium detection apparatus 30 may be implemented as a separate component of the lithium extraction system 10, such as a separate vessel that receives a fluid flow from adsorption beds 14 or other components within the lithium extraction system 10. In some embodiments, the lithium detection apparatus 30 may be implemented in conjunction with the adsorption beds 14. For example, the lithium detection apparatus 30 may be an adsorption bed 14 that includes the radiation detectors 106 and the radiation source 104 disposed in suitable positions within and/or on the adsorption bed 14 to measure the lithium concentration of a fluid within the adsorption bed 14.

As illustrated, the radiation source is disposed within a source housing 142. Additionally, the radiation detector 106 is disposed within a detector housing 143. In general, the source housing 142 and/or detector housing 143 may be formed of any suitable material that protects the radiation source. In some embodiments, the source housing 142 and/or the detector housing 143 may increase the longevity of the radiation source and/or the radiation detector 106 by preventing the radiation source from being exposed to corrosive fluids. In some embodiments, the source housing 142 may ensure proper positioning with respect to the sample volume and the radiation detectors 106.

In some embodiments, the radiation source 104 is removable from the source housing 142, such as a reactor column, holder, or other container. In some embodiments, the radiation source 104 may be placed on a sacrificial or separate source housing 142, such as a reactor vessel containing a solid lithium-sorbent material 108 that is exposed to a liquid or liquids over a long period of time to determine the end of life of the solid lithium-sorbent material 108. For example, the sacrificial source housing 142 may be configured to erode, decay, or otherwise change due to repeated measurements within the lithium detection apparatus 30.

Figure 4:
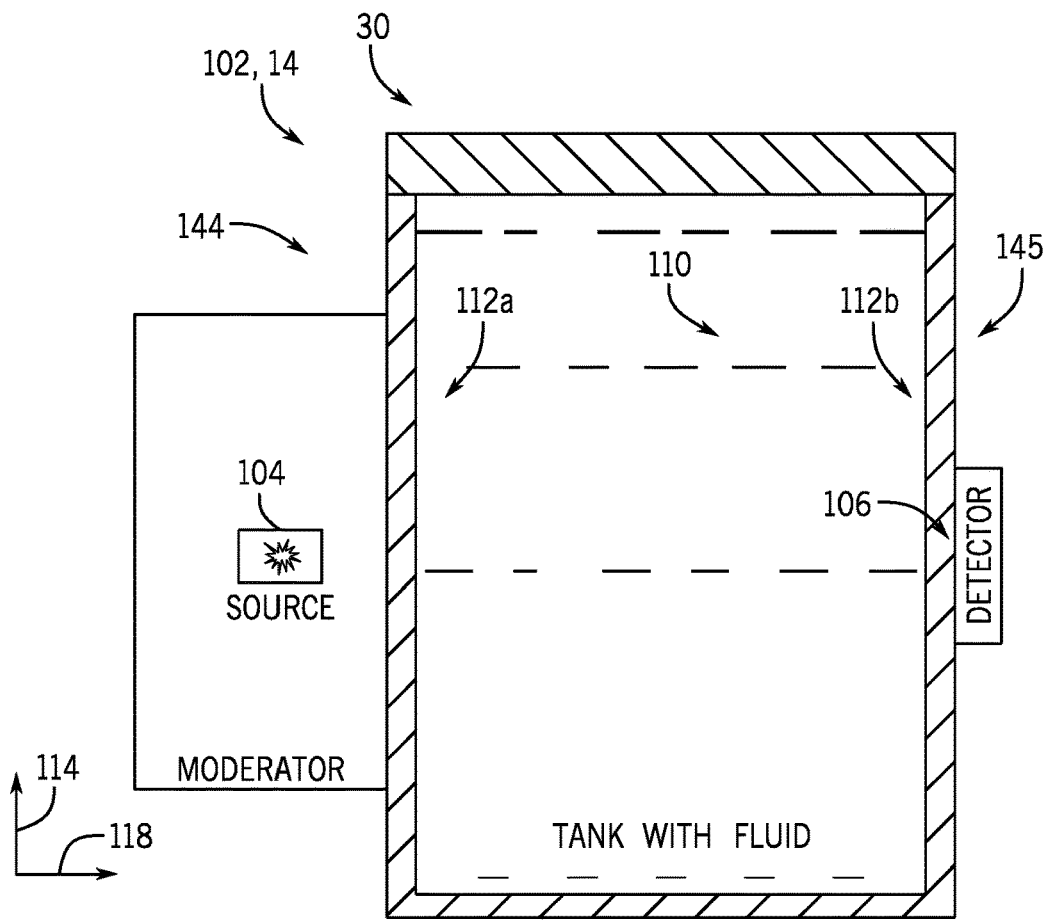
FIG. 4 is a schematic diagram of a second example of the lithium detection apparatus of FIG. 2, in accordance with an aspect of the present disclosure.

As described herein, the radiation source and the radiation detector 106 may be positioned in various positions within the vessel 102. FIG. 4 illustrates a schematic diagram of the lithium detection apparatus 30 that includes the radiation source and the radiation detector 106 disposed outside of the vessel 102. In some embodiments, the vessel 102 may be the adsorption bed 14. In particular, the radiation source 104 is disposed on an outer surface 144 (e.g., outside of the volume 110) of a first wall 112a of the vessel 102. In this case, an additional neutron moderator (and absorber) may be used to modify the energy spectrum of the neutrons released and/or to control the amount of neutrons that are not passing through the vessel. Additionally, the radiation detector 106 is disposed on an outer surface 145 of a second wall 112b of the vessel 102.

Figure 5:
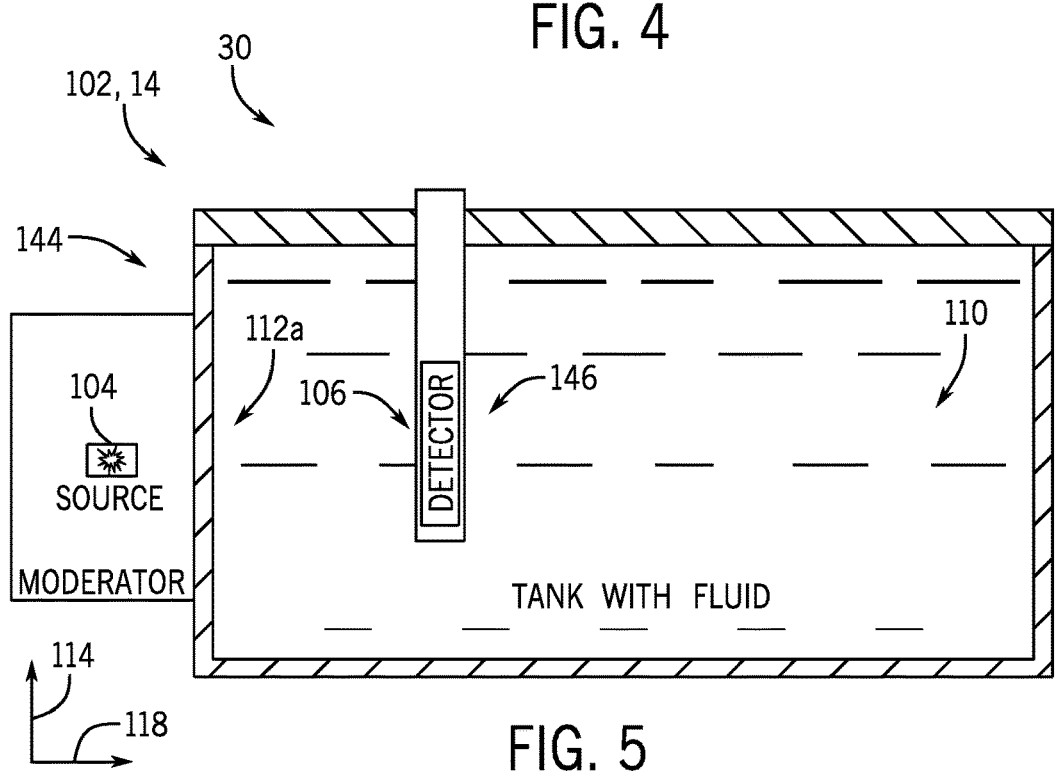
FIG. 5 is a schematic diagram of a third example of the lithium detection apparatus of FIG. 2, in accordance with an aspect of the present disclosure.

FIG. 5 illustrates a schematic diagram of the lithium detection apparatus 30 that includes the radiation source disposed on an outer surface 144 (e.g., exterior surface) of the vessel 102, and the radiation detector 106 is disposed in an interior position 146 of the vessel 102. In some embodiments, the vessel 102 may be the adsorption bed 14. As shown, the outer surface 144 is on the wall 112a of the vessel 102 and outside of the volume 110 of the vessel. The interior position 146 is within the volume 110 of the vessel. In an embodiment where the lithium detection apparatus 30 includes multiple radiation detectors 106, each radiation detector 106 may be on a different wall 112 of the lithium detection apparatus 30. In some embodiments, at least one radiation detector 106 may be disposed in the exterior position and at least one radiation detector 106 may be disposed in a suitable interior position inside the volume 110 of the vessel. For example, in some embodiments, the suitable interior position may be coupled to the wall 112 and within the volume 110 of the vessel 102.

Figure 6:
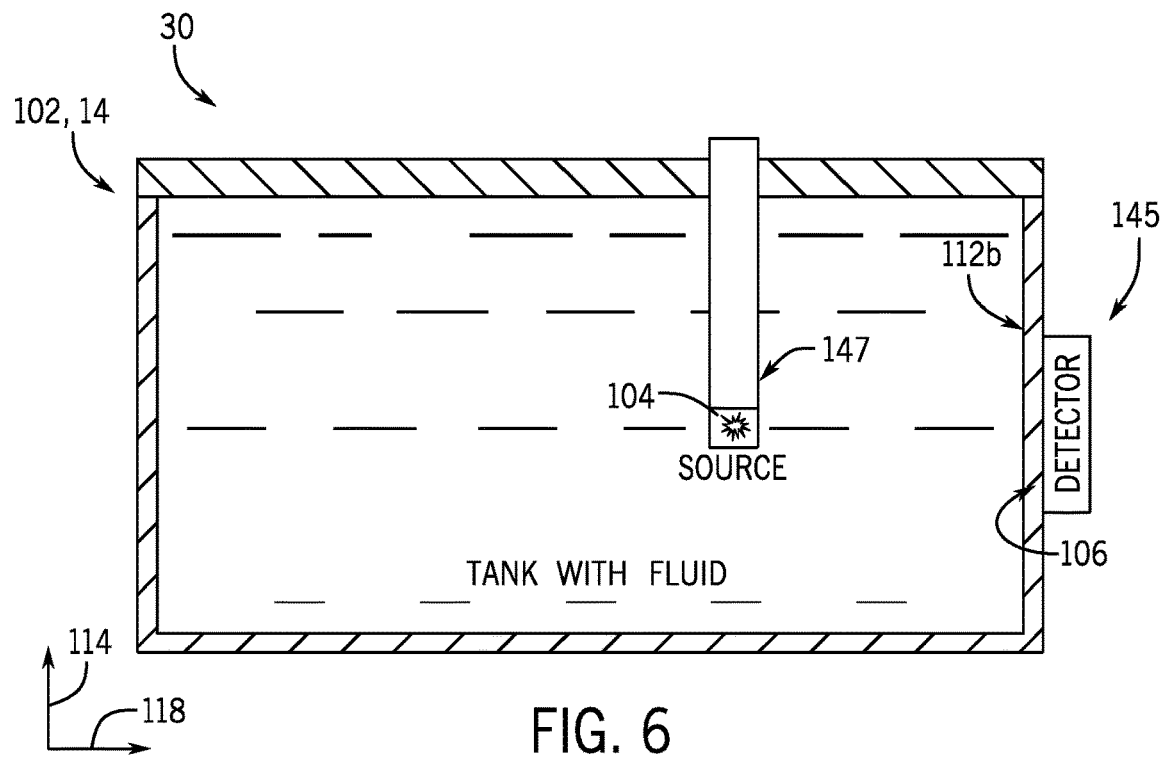
FIG. 6 is a schematic diagram of a fourth example of the lithium detection apparatus of FIG. 2, in accordance with an aspect of the present disclosure.

FIG. 6 illustrates a schematic diagram of the lithium detection apparatus 30 that includes the radiation source disposed in an interior position 147 of the vessel 102, and the radiation detector 106 is disposed in an outer surface 145 of the vessel 102. In some embodiments, the vessel 102 may be the adsorption bed 14. The interior position 147 and/or outer surface 145 may be generally similar to the positions described with respect to FIG. 5.

Figure 7:
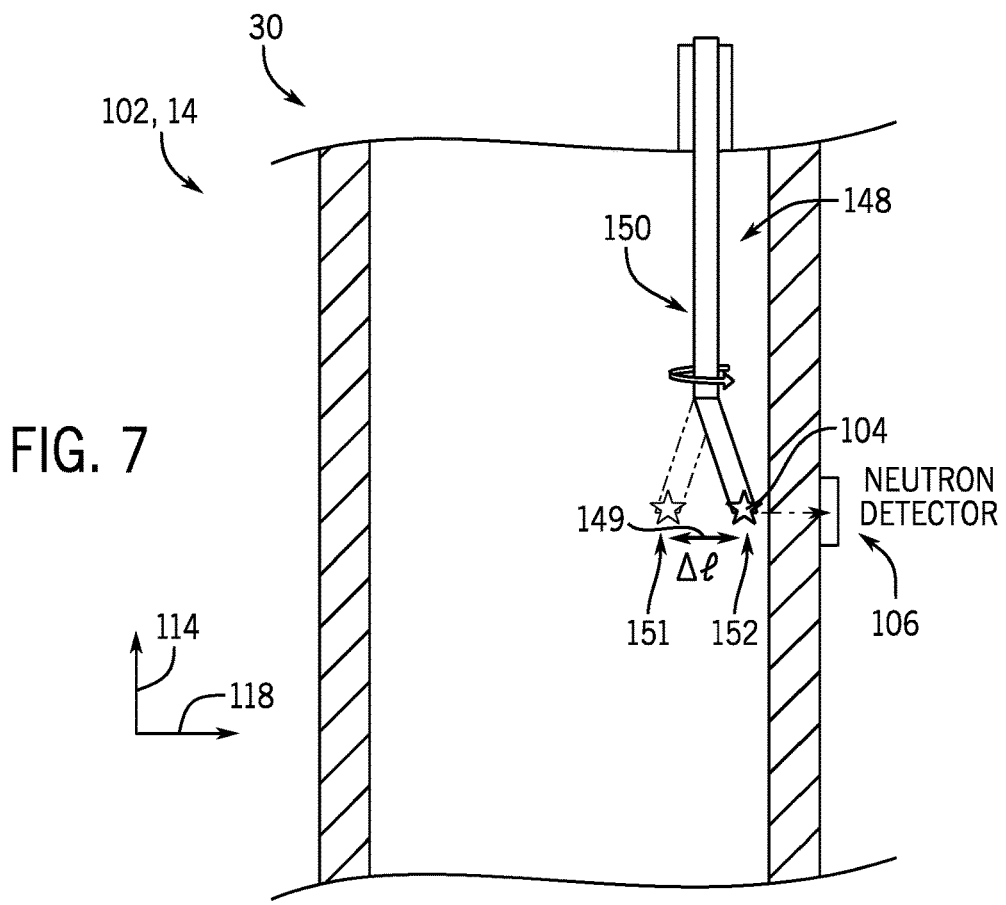
FIG. 7 is a schematic diagram of a first example of the lithium detection apparatus of FIG. 2 that includes a path length adjustment subsystem, in accordance with an aspect of the present disclosure.

In some embodiments, the position of the radiation detector 106 and/or radiation source 104 may be adjustable. To illustrate this, FIG. 7 illustrates a schematic diagram of the lithium detection apparatus 30 with path length adjustment subsystem 148 within the vessel 102. In some embodiments, the vessel 102 may be the adsorption bed 14. In the illustrated embodiment, the path length adjustment subsystem 148 includes a pivotable or rotating arm 150 (e.g., including one or more actuators) that operate to modify or adjust the distance 149 between the radiation detector 106 and the radiation source (e.g., from a first position 151 to a second position 152). In other embodiments, the rotated source and the detector may be placed entirely within the sample tank. This arrangement may serve to minimize the leakage of neutrons from the tank, which may have advantages for health and safety, while preserving improvements in measurements due to a differential path length measurement. The path length variation may be performed along any directional axis, whether horizontal (e.g., the longitudinal axis 118), vertical (e.g., the lateral axis 114), or otherwise.

Figure 8:
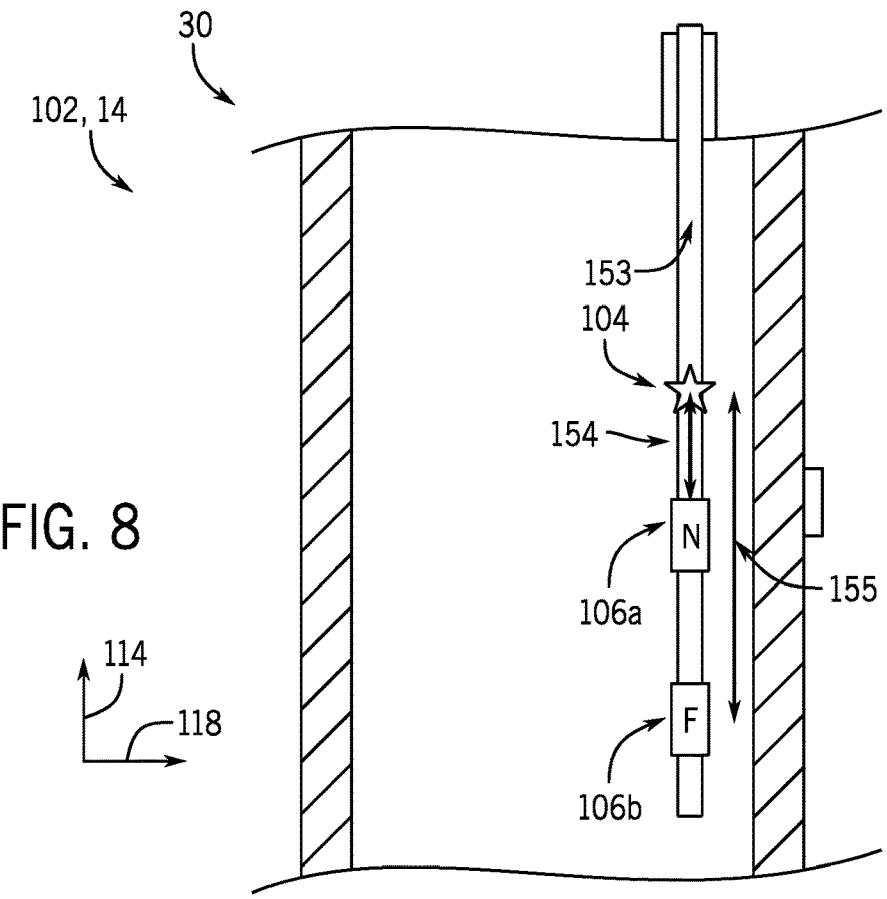
FIG. 8 is a schematic diagram of a first example of the lithium detection apparatus of FIG. 2 having multiple detectors, in accordance with an aspect of the present disclosure.

FIG. 8 illustrates a schematic diagram of the lithium detection apparatus 30. As shown, the lithium detection apparatus 30 includes radiation source 104 coupled to a detection body 153 within the vessel 102. In some embodiments, the vessel 102 may be the adsorption bed 14. The lithium detection apparatus 30 includes a first radiation detector 106a separated from the radiation source 104 by a distance 154, and a second radiation detector 106b separated from the radiation source 104 by a distance 155. As described herein, two or more separate radiation detectors 106 may be used to form a ratio of count rates. Each radiation detector 106 may have a unique distance or path length from radiation source 104 to the radiation detector 106. As such, a controller 122 may perform a ratio measurement without moving parts or a variable source position. The information on lithium concentration may be related to the ratio of counts from the two or more detectors and a fixed source. It is presently recognized that this arrangement in FIG. 8 may provide an advantage such that the source strength will cancel out in the ratio of counts. At least in some instances, it may be useful to calibrate the radiation detectors 106 using known lithium concentrations to account for radiation detector 106 efficiencies. In one embodiment, the gamma radiation emitted from a neutron source (e.g., AmBe) may be used to monitor the distance of the source to a detector, thus allowing to correct the neutron counts for a variation in the source-detector distance.

Figure 9:
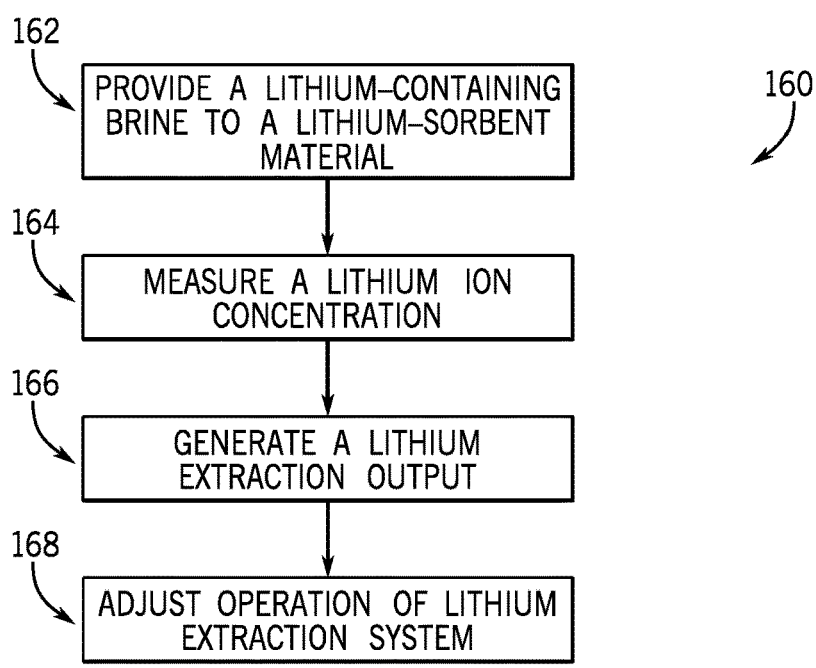
FIG. 9 illustrates a flow chart of a method for determining operational adjustments to control the lithium extraction system of FIG. 1, in accordance with an aspect of the present disclosure.

FIG. 9 illustrates a flowchart of a process 160 for monitoring a lithium concentration (e.g., a lithium-ion concentration) within a brine stream (e.g., a lithium-containing brine stream). One or more blocks of the process 160 may be implemented by a processor 124 of the controller 122 for modifying operation of the lithium extraction system 10 based on a measured lithium concentration by the lithium detection apparatus(es) 30. Although certain steps of the process 160 are described as being performed by the processor 124, it should be noted that any suitable processing device may be capable of performing the process 160. In some embodiments, one or more of the blocks may be omitted or performed in a different order than shown.

As shown in FIG. 9, the process 160 includes providing a lithium-containing brine to a lithium detection apparatus 30, as shown in block 162. For example, the adsorption bed 14 may be disposed in a suitable position to receive the lithium-containing brine stream 12 and/or the lithium-containing brine stream 12 may be directed to the lithium detection apparatus 30 via one or more valves 21 and one or more pumps 20.

The process 160 may include measuring a lithium-concentration based on an amount of lithium-adsorbed by the lithium-sorbent material 108, as shown in block 164. The lithium-concentration may correspond to a lithium concentration in the vessel (e.g., lithium concentration within a fluid in the volume 110 including the lithium-sorbent material 108). In some embodiments, this may include the processor 124 controlling the radiation source 104 to emit radiation into a vessel 102 with the lithium-sorbent material 108. For example, the processor 124 may instruct the radiation detectors 106 and/or the radiation source to operate, and thereby acquire or measurements related to the lithium-ion concentration (e.g., via the radiation detector 106 collecting neutrons or a subset of neutrons). In any case, the processor 124 may determine a lithium-ion concentration based on the measurements acquired by the one or more radiation detectors 106. In some embodiments, the lithium-ion concentration may include a combination of solvated lithium ions and chemically or physically bound lithium ions on a solid lithium-sorbent material 108.

As described herein, measuring the lithium-concentration may use multiple radiation detectors 106 and/or multiple radiation sources 104. In some embodiments, multiple measurements may be combined. For example, a neutron measurement may be combined with one or more analytical measurements to determine the loading capacity of the solid lithium-sorbent material 108, lithium concentration, or other ions concentration.

In some embodiments, the processor 124 may determine the lithium-concentration based on a ratio of detected counts from multiple radiation detectors 106 and/or multiple measurements corresponding to the radiation detectors 106 and/or radiation sources 104 in different positions. In some embodiments, the ratio of solvated lithium ions and bound lithium (e.g., on the lithium-sorbent material 108) may be determined by the contact time, temperature and the salinity/composition of the fluid including the submerged lithium-sorbent material.

In some embodiments, the processor 124 may determine a loading capacity of the lithium-sorbent material 108. In general, the loading capacity may indicate a remaining lifetime of one or more lithium-sorbent materials 108 and/or an amount of lithium adsorbed by the lithium-sorbent materials 108. For example, a first measurement of loading capacity may be compared to a previous measurement of loading capacity (e.g., an initial measurement), and the lifetime may be calculated based on a ratio of the two measurements. In some embodiments, the loading capacity or ensemble lithium concentration determined by neutron measurement may be used to control the cycle time of the lithium extraction system 10. In some embodiments, the loading capacity may be measured during the duration of one cycle time. As used herein, the "cycle time" refers to a time period during which an adsorption bed 14 receives a flow of liquid to unload or load the adsorption beds 14.

In general, the lithium-ion concentration may be used to improve the efficiency of the lithium extraction system 10. For example, in some embodiments, the neutron measurement is used to determine that a lithium concentration is within a threshold range or above a threshold concentration (e.g., a minimum lithium concentration) in the vessel 102. In some embodiments, the neutron measurement detects known interferences (or non-lithium ions) in a column initially filled with one fluid and a solid lithium-sorbent material 108 has been substantially replaced by another fluid.

At block 166, the processor 124 may determine a lithium extraction output based on the lithium concentration. In general, the lithium extraction output may include an alert or control signal that causes a modification to the operation of the lithium extraction system 10 (e.g., adjust a position of a valve 21 or speed of a pump 20). As such, the lithium extraction output may aid an operator or user in determining when to replace lithium-sorbent material 108. In an embodiment where multiple measurements are used (e.g., a neutron measurement and another type of measurement), the lithium extraction output may be determined using each measurement. For example, the lithium extraction output may be corrected based on temperature and/or other elements present as described herein.

At block 168, the processor 124 adjusts operation of the lithium detection apparatus based on the lithium extraction output. For example, the processor 124 may output a control signal that causes an actuator to actuate, thereby modifying a position of a mechanical component of the path length adjustment subsystem 148. In some embodiments, the lithium extraction output may be a control signal that adjusts the simulated moving bed (SMB) cycle time, flow rates, or temperature (e.g., a feed temperature into the adsorption beds and/or lithium extraction system). For example, the processor 124 may determine that the loading capacity of a lithium-sorbent material 108 exceeds a capacity threshold (e.g., 50%, 60%, 70%, 80%, 90%, or 95%) indicating it may be advantageous to reduce the flow rate of the lithium-containing brine to the lithium-sorbent material 108. As such, the lithium extraction output may be a control signal that reduces the speed of a pump 20, adjusts a position of a valve 21 (e.g., closes a valve), cause a display of a computing device to display an alert indicating that the lithium-sorbent material 108 should be replace. It should be noted that the process 160 may be used to monitor one or more cycles for the one or more zones. At least in some instances, a concentration of the species of interest (e.g., lithium) may vary over time. As such it may be useful to acquire measurements during a variation period and/or over much longer time scales. The variation in the species is used to quantify the operating state of the lithium-sorbent material 108 in the apparatus and measure its change over time.

It is presently recognized that process 160 may be used for multiple different applications related to extractions of salts. For example, the process 160 may be used to improve the measurement accuracy of the lithium extraction system 10 during the cycling of the liquids (having known and unknown compositions). In some embodiments, the process 160 may be used to monitor lithium concentration during a dewatering process, such as reverse osmosis. In some embodiments, the process 160 may be used to infer changes in loading capacity over time and thus predict or quantify the replacement or regeneration needs of the lithium-sorbent material 108 during a process cycle (e.g., a loading cycle and/or an unloading cycle). Further, the process 160 may be used to monitor changes in liquid composition (e.g., a lithium concentration in a liquid) that occurs over a predetermined time period (e.g., a cycle). Further, the process 160 may be used to monitor changes in lithium concertation where the liquid fraction composition of adsorption bed 14 including lithium-sorbent material 108 is varied over time, and where such variation may or may not be well quantified. In embodiments where the known nature of at least one of the liquid fraction species used is well known, such as reverse osmosis water, the process 160 may be used to determine the unknown Lithium concentration in a previous liquid fraction (e.g., after a cycle has occurred) by knowing that the changes in the lithium concentration in the solid lithium-sorbent material 108 are unable to change as fast as the liquid may be changed.

Figure 10:
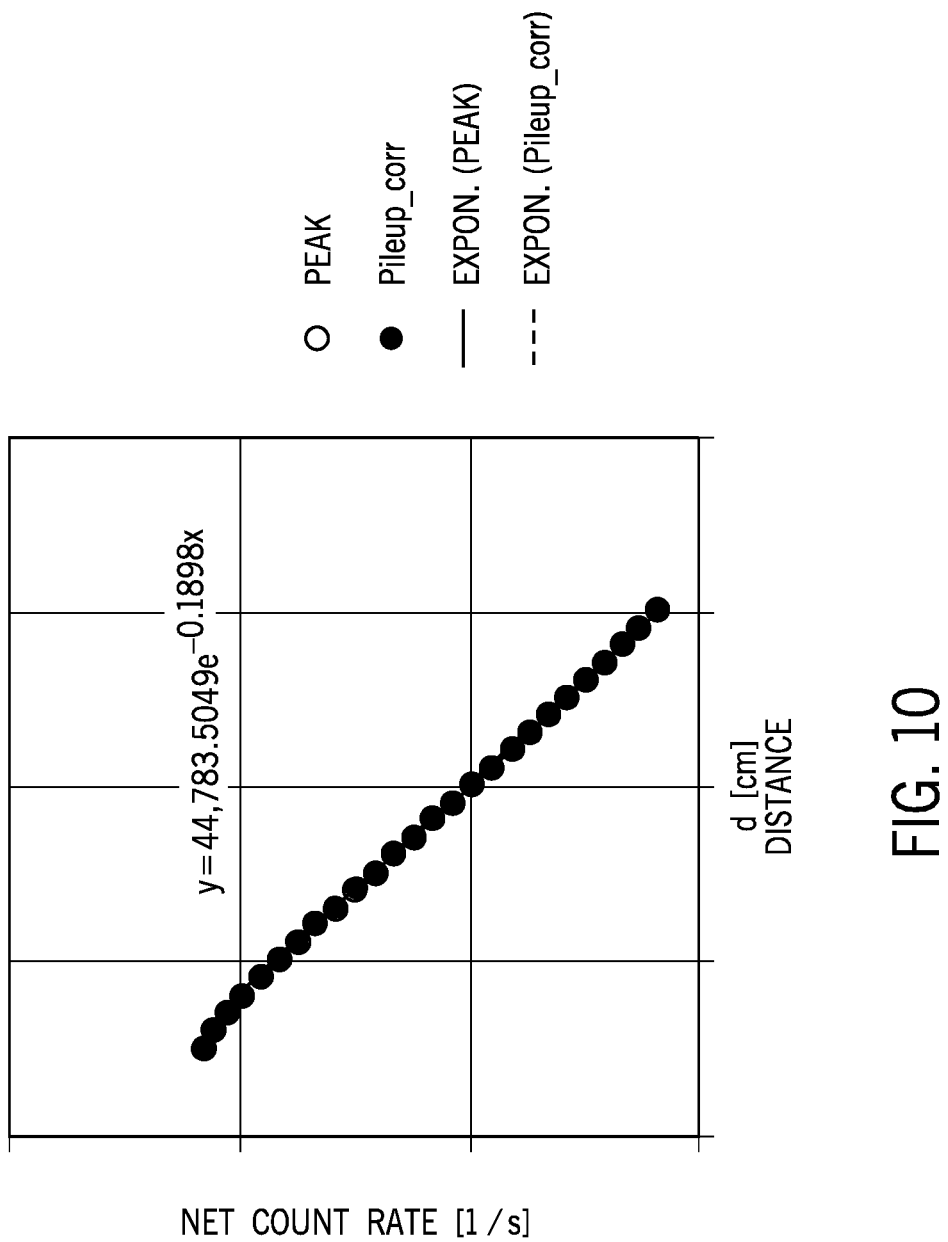
FIG. 10 shows a graph of count rates versus distance between a radiation detector and a radiation source, in accordance with an aspect of the present disclosure.

Provided below is an example of techniques of the present disclosure to facilitate the discussion herein with respect to lithium measurement, as described in block 164 of FIG. 9. FIG. 10 shows a graph of net count rate (e.g., y-axis) versus distance (e.g., x-axis) between the radiation detector 106 and the radiation source. In this example, the radiation detector 106 is a thermal neutron detector. In the graph of FIG. 10, the distance between the radiation detector 106 and the radiation source in a water tank is not corrected for the distance (d) squared.

Figure 11:
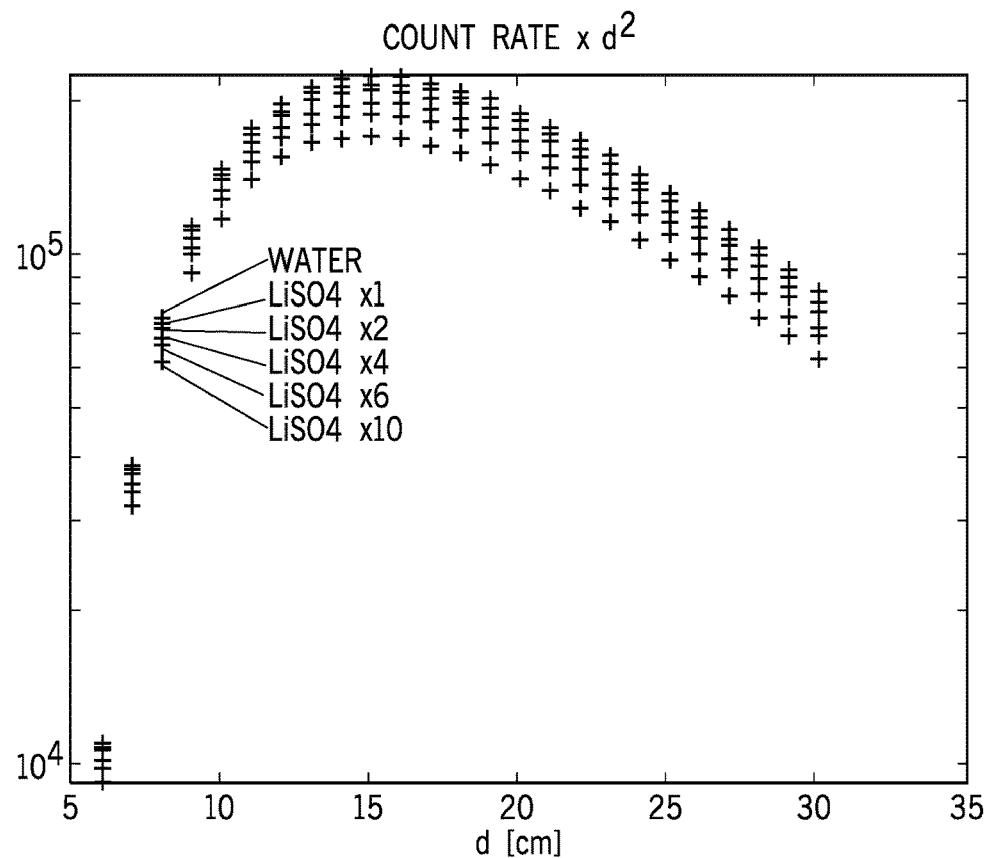
FIG. 11 shows a graph of count rates versus distance for different lithium concentrations, in accordance with an aspect of the present disclosure.

It should be noted that the fundamental dilution of the neutron flux with distance (d) may make it difficult to see any other features in the measured data. The graph of FIG. 11 shows a diagram where the detected count rate in a detector with fixed size but changing source detector distance (d) is multiplied by the factor d-squared ($d^2$). It should be noted that a full transformation into neutron flux it may be advantageous to compensate for certain effects, such as the changes in solid angle of the detector, adjustments for the neutron energy spectrum, and the processes of slowing-down and diffusion of the neutrons. However, for simplicity, the compensation is not used in this example. The data shown are for room temperature. A compensation for temperature effects on count rate can be computed from a separate temperature measurement of the material and the known effect of temperature on the neutron cross sections.

In FIG. 11, as compared to FIG. 10, the detector count rate in water is shown again, but due to the multiplication with the distance squared, the impact from the effect of neutron interactions with matter is more apparent. First, the slow neutron fraction, which the measurement is sensitive to, is building up as the detector is moved away from the source. Second, the diffusion and capture of neutrons by the intervening matter lead to a drop of neutron counts with increasing distance. The effects (i.e., the slow neutron fraction and the diffusion and capture of neutrons) together make the thermal neutron flux increase towards a certain distance and then drop steadily toward very large distances. The position of the peak is related to the slowing down length (L) in the liquid (e.g., water), i.e. a characteristic distance over which energetic neutrons from the source are moderated until they reach a slower, thermal energy regime where they have a high probability of being captured or detected. As lithium (e.g., here in the form of lithium sulfate) is added (e.g., the amount added corresponds to '×1', '×2', '×4', '×6', and '×10'), the qualitative features of the curve remain, but the count rate (e.g., multiplied by $d^2$) at any given distance is reduced in proportion to the lithium concentration. It is presently recognized that, for a given detector distance, the lithium concentration may be determined from the count rate of the detector when compared to the count rate of the same detector in pure water. Thus, in the case of a homogeneous distribution, the techniques of this disclosure provide an accurate detection system for lithium concentrations.

Figure 12:
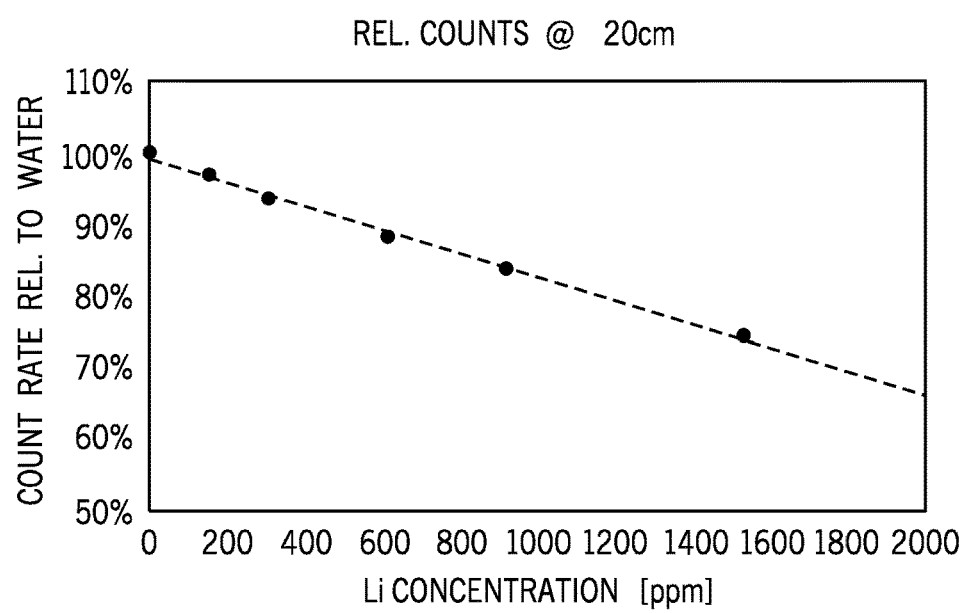
FIG. 12 shows a graph of count rates relative to water versus lithium concentration, in accordance with an aspect of the present disclosure.

FIG. 12 shows the plot of the count rates (e.g., y-axis) in the detector for different Li concentrations (e.g., x-axis) relative to the count rate of the water point. Statistical fluctuations are visible on top of the general trend. Error bars are not shown for simplicity. The plot fits a linear trend. While higher order terms may be utilized at higher concentration, FIG. 12 demonstrates that the curve may be fitted with a steady function. It should be noted that the exact shape of the function may depend on the details of the setup (e.g., the arrangement of the radiation source, radiation detector(s) 106, and so on). Calibration of the curve may be performed by experiment in conjunction with a more-or-less refined simplified model as described above, or by detailed computer modeling (e.g. with MCNP or other codes for radiation transport). The exact procedure may depend on a desired accuracy of the measurement versus convenience and speed.

Environmental Effects

In some embodiments, the processor 124 may correct the count rate (e.g., determine a corrected count rate) based on environmental effects. That is, it should be noted that certain environmental effects may impact the measurement. For example, the temperature of the setup including the moderator and the sampled material changes the average energy of the thermal neutrons and thus the cross section. This effect may be determined as the variations in cross section for the most influential elements are known. The correction requires that the temperature is known. One embodiment may include a (set of) temperature sensor(s) for a thermal correction. Note, that the velocity of thermal neutrons is still large compared to any additional components from fluid movements in the active volume. A correction for such fluid movements is therefore a secondary effect.

Figure 13:
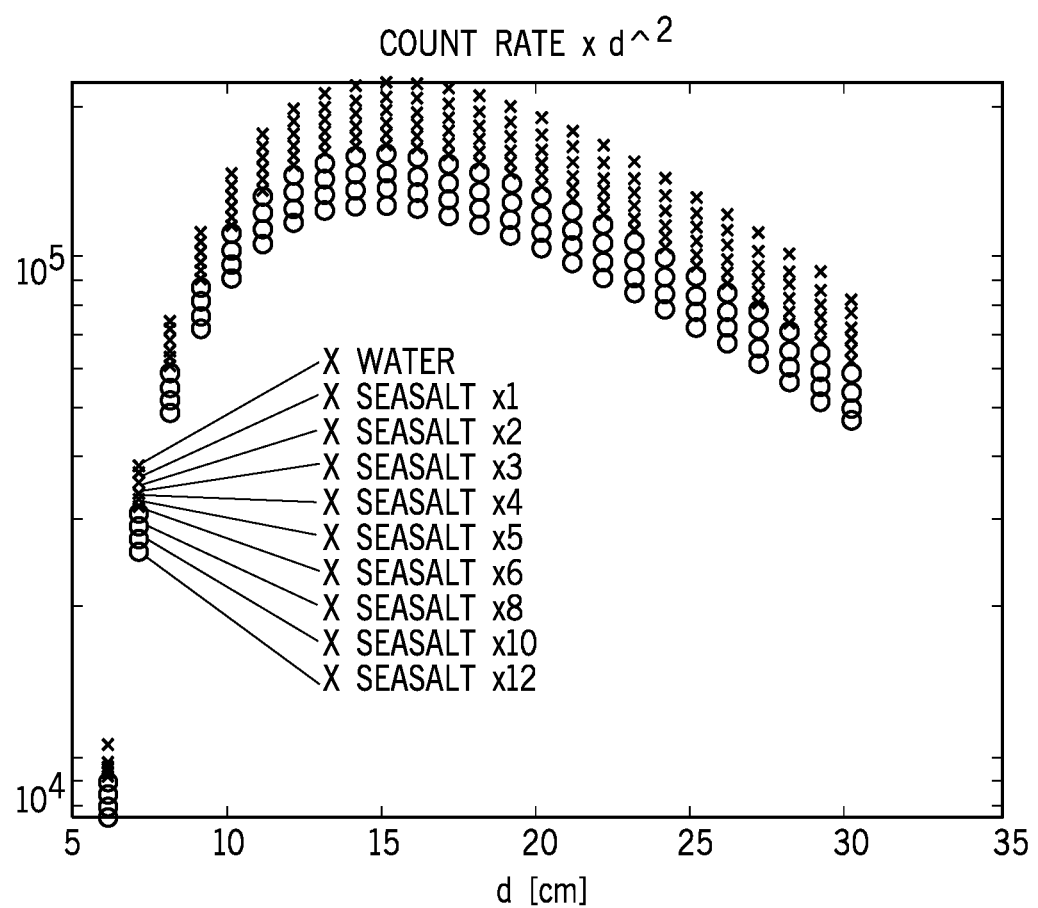
FIG. 13 shows a graph of count rates versus distance for different chlorine concentrations in a sample, in accordance with an aspect of the present disclosure.

The presence of elements other than hydrogen, oxygen and lithium may have an impact on the accuracy of the measurement. Accordingly, it may be advantageous to utilize measurements obtained by the radiation detectors 106 (e.g., neutron detectors) that correspond to other elements that may be present in a lithium-containing solution, especially those with high neutron cross sections and/or high concentration such as chloride, gadolinium, boron, sodium, potassium, hydrogen, and so on. In one embodiment, the measurement may be taken while chloride is present in the sample liquid in concentrations up to 240,000 ppm (e.g., 240,000 ppm or less, 200,000 ppm or less, 100,000 ppm or less, 50,000 ppm or less, or up to saturation of the salt species).) FIG. 13 shows the variation of count rates in the detector for different concentrations of chloride, as added to the water in the form of common salt (NaCl).

Figure 14:
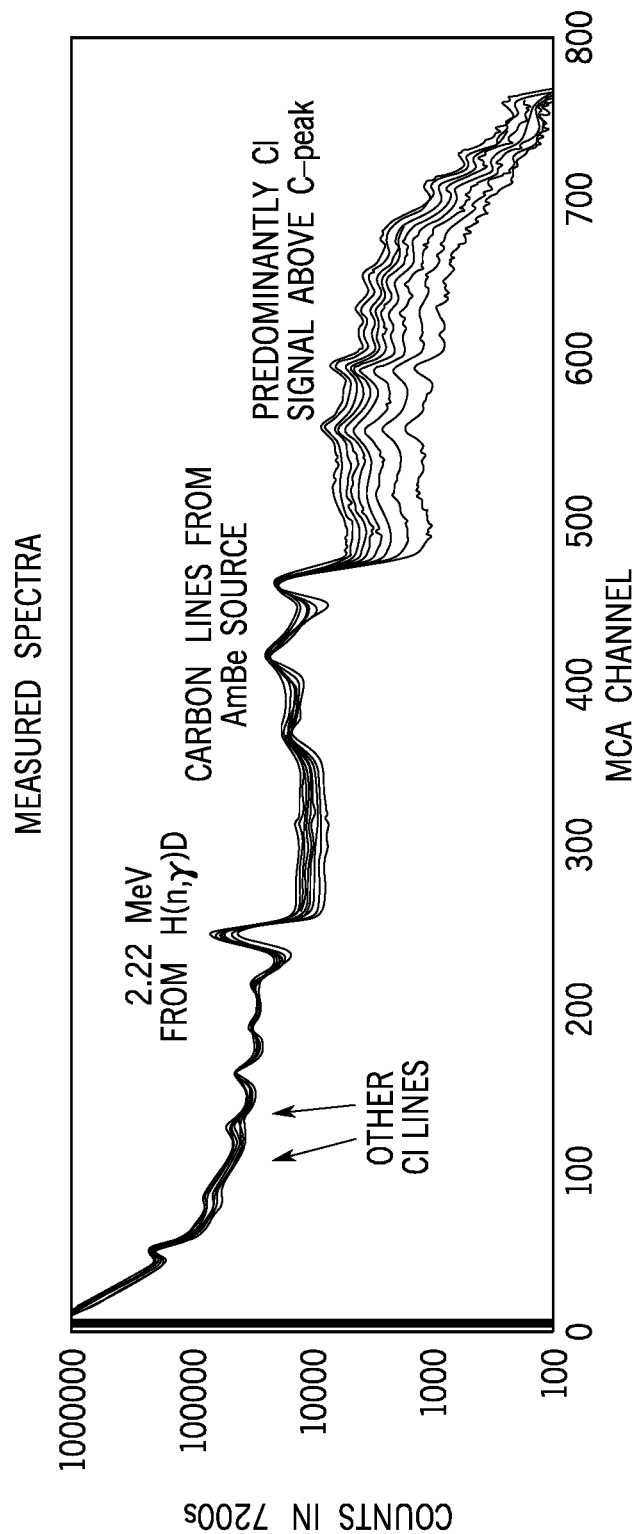
FIG. 14 shows a graph of a gamma spectra indicating elements that may be present in a brine solution, in accordance with an aspect of the present disclosure.

In one embodiment, the radiation detector 106 may be an external gamma detector (e.g., disposed on an exterior surface of the vessel 102) to measure the characteristic gamma-rays of the chlorine signal. FIG. 14 shows a graph of gamma-ray energy spectra indicating elements that may be present in a brine solution. In this example embodiment corresponding to FIG. 14, the radiation source is an AmBe source. However, it should be noted that this example source is non-limiting and the radiation source may include other sources that create neutron-gamma reactions (e.g., other radioisotope neutron sources, pulsed neutron sources, etc.) as described herein.

Figure 15:
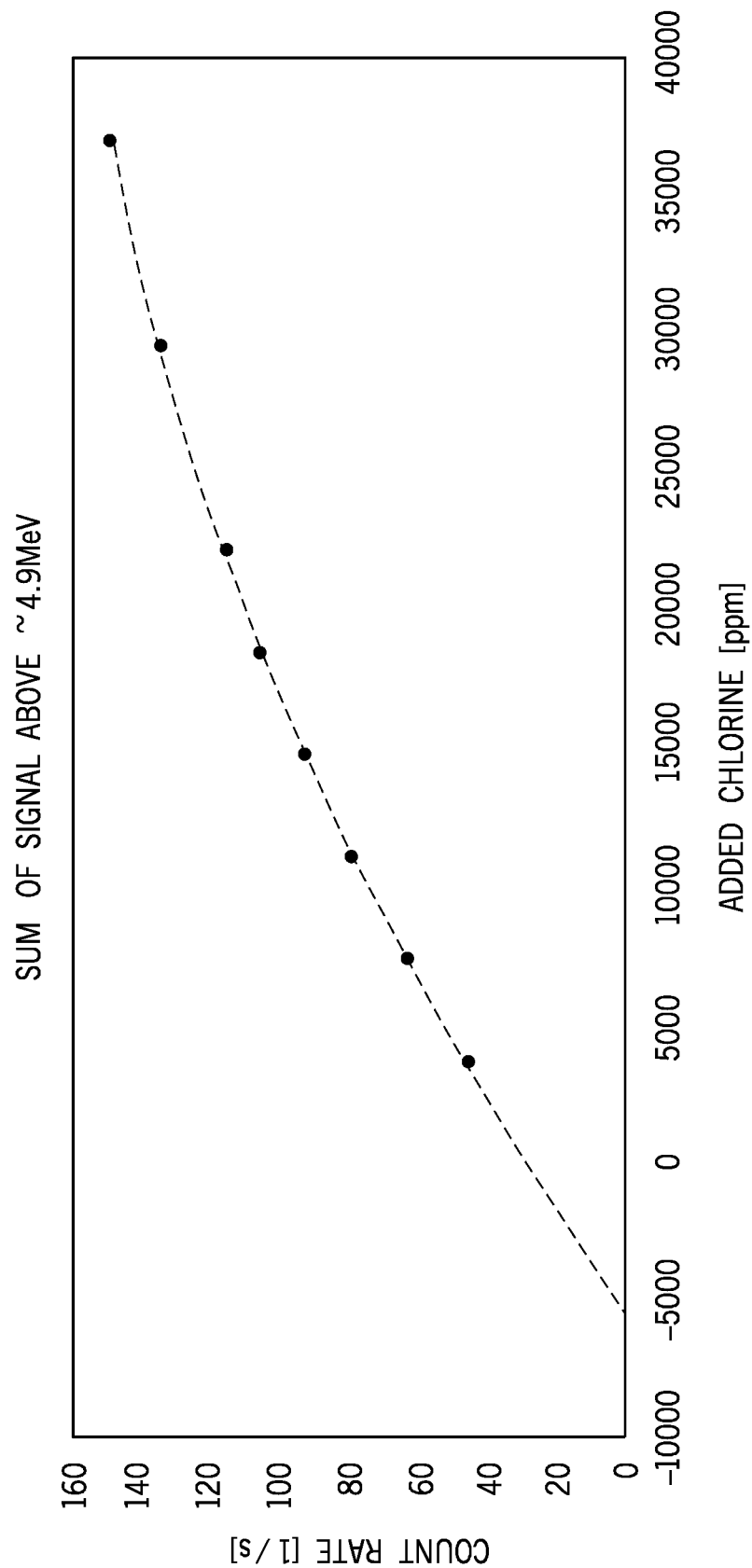
FIG. 15 shows a graph of count rates versus added chlorine concentration, in accordance with an aspect of the present disclosure.

The intensity of this signal may then be used to quantitatively evaluate the chlorine concentration. FIG. 15 shows count rate versus adding chlorine and generally illustrates a relationship between chlorine and count rate. Data points corresponding to this plot may be stored in a table format or other suitable format to be accessed by the processor 124 to remove artifacts from chlorine. Once the chlorine concentration is known, the cross section due to this chlorine may be determined and the neutron attenuation measurement may be corrected to infer the lithium concentration.

At least in some instances, other elements may be present which may affect the accuracy of the lithium measurement, such as sulfur. In an embodiment where it is desirable to remove artifacts resulting from sulfur, multiple reference standards for analyzing the gamma-ray spectrum may be used to distinguish the characteristic gamma-rays. In this way, the acquired spectrum may reveal the different interfering elements in their proper proportions. This may be done in analogy to techniques known to those skilled in the art from nuclear well logging (e.g., neutron-induced gamma ray spectroscopy, neutron capture spectroscopy, inelastic gamma spectroscopy, and spectral analysis of naturally occurring gamma rays).

Geometric Effects

One geometrical effect is the radiation source 104 and the radiation detector 106 spacing (e.g., distance 140 or other distance that may include the thickness of the wall 112) which may be known from the design. In an embodiment where the distance between radiation source 104 and the radiation detector 106 is varied, as described with respect to FIG. 7, (e.g. with an actuator), a separate measurement of distance may be employed. This may be direct feedback from the actuator, but other techniques may be employed to ensure an accurate distance determination. If the distance varies due to changing environments such as temperature and pressure, a correction may be applied. If the distance is expected to change by such factors, a second (or more) detector(s) may be used to get an average less impacted by the variation. In one embodiment detectors at different design distances may be used to make the calculations more robust regarding such changes.

Figure 16:
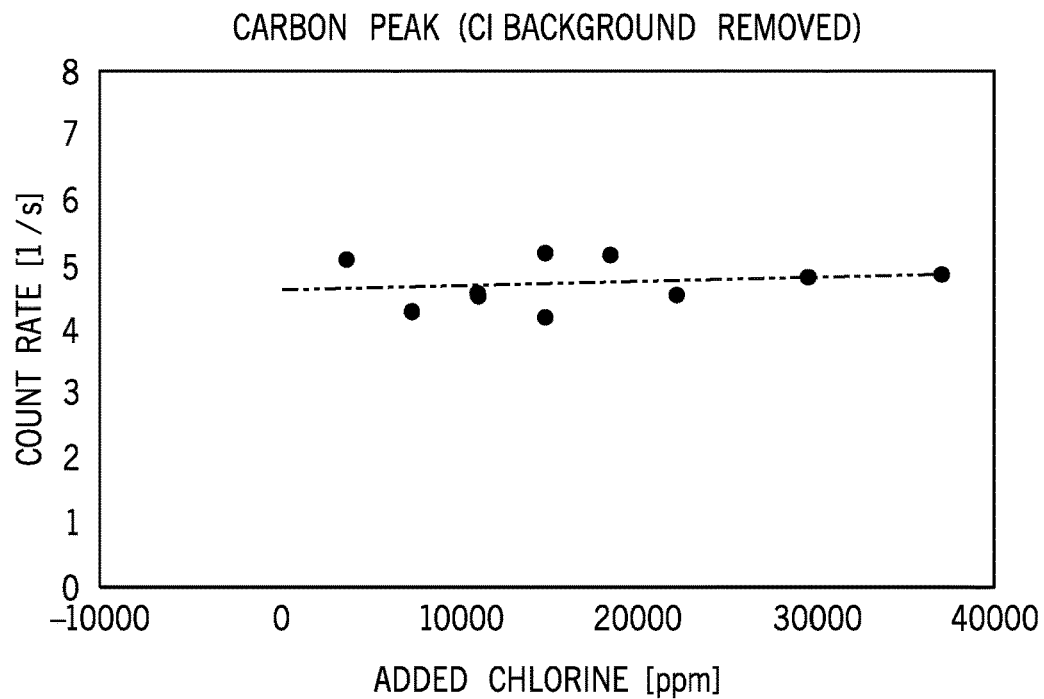
FIG. 16 shows a graph of count rate in a carbon line in a gamma-ray spectrum as shown in FIG. 14, in accordance with an aspect of the present disclosure.

In one embodiment of the present disclosure in which a gamma detector is used in conjunction with an AmBe source, the intensity of the carbon gamma-rays emanating directly from the radiation source 104 may be used as an additional input in confirming the radiation source 104 and the radiation detector 106 distance, as the 4.4 MeV gamma-rays from AmBe are for the most part insensitive to concentration changes of lithium and other light elements in the sample volume. To illustrated this and facilitate discussion, FIG. 16 shows a graph of count rate in a carbon line in a gamma-ray spectrum as shown in FIG. 14. Because the gamma rays are emitted directly from the source in this embodiment, and the gamma rays are attenuated as they interact with the intervening matter over the source-detector distance, the measured gamma-ray count rate may be used to infer the source-detector distance. Additional density corrections may be applied if heavier elements are present in a matrix.

The walls 112 of the vessel 102 and/or the source housing 142 and detector housing 143 will add distance to the source-detector that is not useful for the assaying. The lowered statistics due to the increased spacing may be compensated by increased acquisition time in the measurement, increased source strength, or by employing more efficient detectors, or a larger number of detectors.

Other geometrical considerations may impact the measurement if for example the sample volume is impacted by the presence of nearby materials that are detrimental to the neutron flux. The radiation source 104 and the radiation detector 106 and their respective spacing will be adjusted to reduce these effects. However, there may be a limit to the minimum size of the sample volume which is dependent on the range of concentrations and the needed precision and accuracy. The preferred embodiment will have a large enough active volume to reduce these effects. If the radiation source 104 is close to the edge or outside the sample adsorption bed 14, a moderator may be used to reduce the impact of the external environment. An external neutron absorber may also reduce the effects of unwanted interferences.

Method Based on Ratios of Counts

In some embodiments, using a ratio of detected count rates may be advantageous for inferring the concentration of lithium. The two measurements of count rates in the ratio may be taken from the same radiation detector 106 (e.g., neutron detector) and source in two different configurations that involve the neutrons traversing different distances across the lithium-bearing sample. A ratio may be advantageous because factors like detector efficiency and source strength (whose exact values are often unknown) may be allowed to cancel in the equations for interpreting lithium concentration.

For a source-detector system with a certain path length through the sample volume, the expected neutron count rate in the detector may be written as:

$$N \approx \frac{S}{l^2} \varepsilon_d \cdot e^{-l \cdot \Sigma_{abs}} \quad (1)$$

with source strength s, detector efficiency $\varepsilon_d$, path length l, and macroscopic cross section for neutron absorption $\Sigma_{abs}$. The path length in the denominator represents the familiar "one over r-squared" behavior of particles from an isotropic source, which has also been addressed with a distance correction $d^2$ elsewhere in this description. The exponential term represents the attenuation of neutrons along the path length to the detector. The expression is valid to within a constant of proportionality for the solid angle of the detector and other geometrical factors. The measurement N may represent a count rate or an absolute number of counts integrated over time. The absorption cross section of the sample carries valuable information on lithium concentration, and the path length may be independently measured or controlled while the count rate N is acquired. However, the radiation source 104 strength (e.g., intensity) and detector efficiency may not be well known, because of several factors that may include time-dependent variation, system-to-system variation, or other environmental factors. Despite these challenges, parameters like source strength and detector efficiency may be calibrated in the laboratory or in the operational setting, and a single-detector measurement may still be used to derive the lithium concentration, as illustrated in previous examples in this disclosure.

As an improvement on the single measurement, the unknown terms may be cancelled by taking the ratio of two measurements at different path lengths, both described by the equation above. Two measurements may be acquired, one called "Near" and the other "Far". If the natural logarithm of the ratio is used, then the ratio reduces to:

$$\log \frac{N_{near}}{N_{far}} = 2 \cdot \log \frac{l_{far}}{l_{near}} + \Delta l \cdot \Sigma_{abs} \quad (2)$$

with $\Delta l$ representing the known difference in path length. Therefore, this ratio may be used to infer the total absorption cross section of the sample, which is directly related to the unknown lithium concentration.

Furthermore, if the concentrations of all other elements in the sample are known except for lithium, then the equation above may be reduced further to:

$$\log \frac{N_{near}}{N_{far}} = 2 \cdot \log \frac{l_{far}}{l_{near}} + \Delta l \cdot C_{Li} + \text{constant} \quad (3)$$

for a fixed variation in path length and a known composition of other neutron-absorbing elements besides the unknown lithium concentration $C_{Li}$.

The variable path length and ratio measurement may be achieved via any of the embodiments or physical arrangements that have been discussed previously. Any method of controlling the source-detector distance may be acceptable, and the technique is applicable to any combination of source or detector located inside or outside the sample volume. A main requirement is that the source-detector variation probes a change in path length through the lithium-bearing sample of interest.

Figure 17:
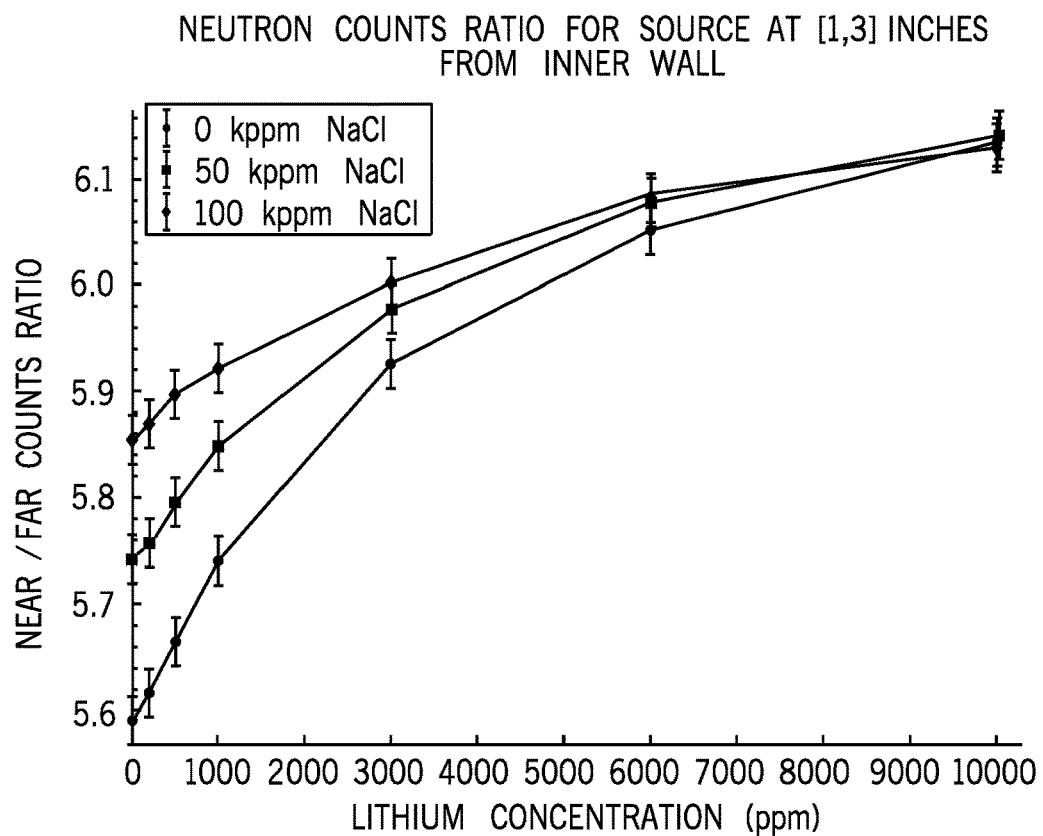
FIG. 17 shows a graph of a count ratio based on measurements by a radiation detector at a fixed position and two different radiation source positions versus lithium concentration, in accordance with an aspect of the present disclosure.

FIG. 17 shows a graph of a count ratio based on measurements by a radiation detector at a fixed position and two different radiation source positions versus lithium concentration. That is, FIG. 17 shows the results for simulated measurements in the abovementioned configuration, as derived from detailed radiation-transport modeling with the MCNP code. More specifically, FIG. 17 shows an example of a ratio of count rates as measured by a single radiation detector for two different source positionings are derived from modeling. This example corresponds to a neutron detector on the exterior of the tank and a source which is rotated inside the tank between locations 1 and 3 inches from the tank's inner wall. The ratio is sensitive to the lithium concentration because of its neutron absorption across the sample material between the two source positions, but the absorption is also affected by varied concentrations of chlorine.

The data in FIG. 17 corresponds to a radiation detector on the exterior of the tank and a source which is rotated inside the tank between two positions, located 1 and 3 inches from the tank's inner wall. This example uses a chemical Cf-252 source and a He-3 proportional counter for the detector. The transport of neutrons from the radiation source 104 to the detector is governed by the slowing-down of the energetic neutrons via elastic scattering, the absorption of thermal neutrons by lithium and other elements, and the isotropic spreading of the neutron population in all energy regimes. The simulated data shows that the ratio of detected count rates is sensitive to the concentration of lithium in the sample material, because it affects the rate of absorption for neutrons traversing the distance between the two source positions. However, the absorption is also affected by the concentration of chlorine, as illustrated by the three distinct trends for variable lithium accompanied by fixed concentrations of 0, 50, 100 thousand parts per million (kppm) NaCl by weight.

Figure 18:
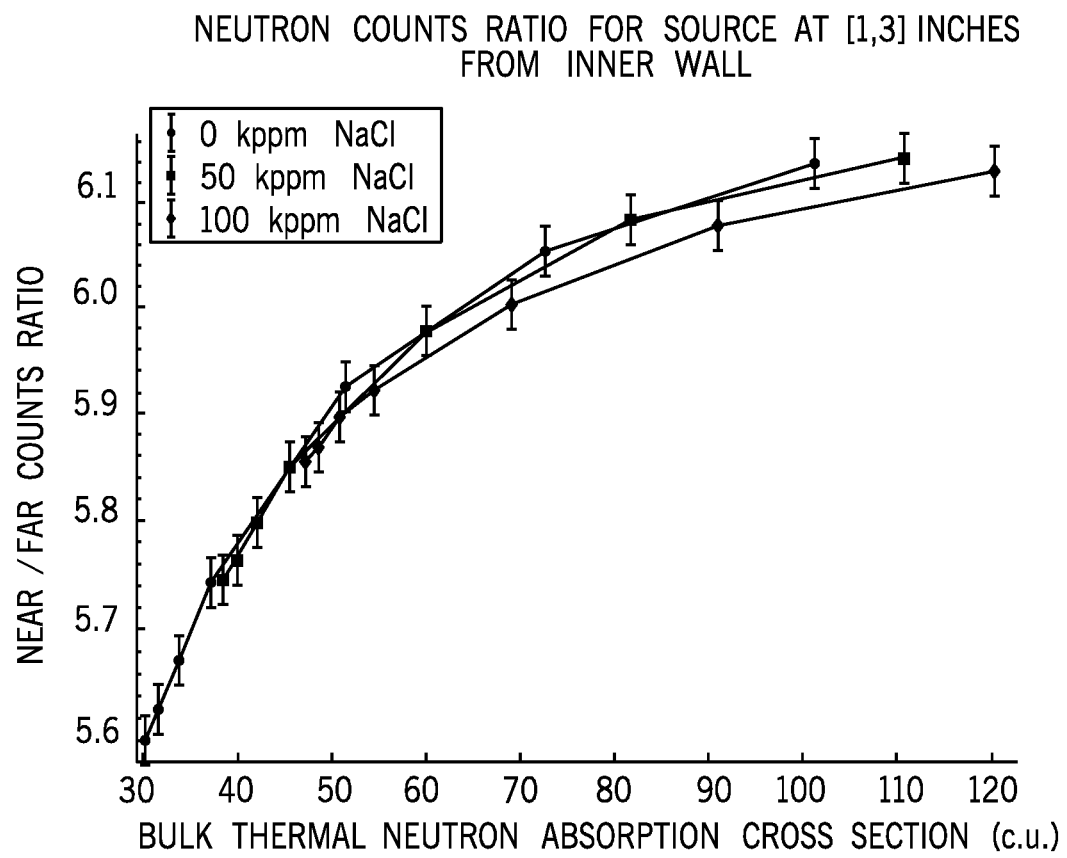
FIG. 18 shows a graph of a count ratio based on measurements by a radiation detector at a fixed position and two different radiation source positions versus a bulk thermal neutron adsorption cross section, in accordance with an aspect of the present disclosure.

FIG. 18 shows a graph of a count ratio based on measurements by a radiation detector at a fixed position and two different radiation source positions versus a bulk thermal neutron adsorption cross section. In general, FIG. 18 shows a graph of the same data as FIG. 17 but with respect to the total absorption cross section of the bulk sample (instead of simply using the lithium concentration on the horizontal axis). More specifically, FIG. 18 shows an example of a ratio of count rates as measured by a single detector for two different source positionings, as derived from detailed radiation-transport modeling. The data are the same as FIG. 17, but are now plotted with respect to the total cross section for neutron absorption (including Li, Cl, and all elements in the sample mixture). The data points all fall onto a similar trend. With knowledge of the concentrations of all other elements in a sample, the lithium concentration may be inferred from this measurement of the total absorption cross section.

The three groups of data points fall more closely onto a common trend than when they were plotted with respect to lithium concentration alone, despite having various concentrations of both lithium and chlorine. This behavior illustrates the fundamental dependence of the count ratio on the total absorption cross section (e.g., including lithium, chlorine, hydrogen, and any other elements contained in the sample). In an embodiment where the composition of other elements besides lithium are known, then a neutron measurement or ratio of neutron measurements may be used to infer the total neutron absorption cross section and therefore the lithium concentration. The non-lithium elements may be measured independently by gamma-ray spectroscopy, as described herein, or by direct sampling or control of the sample materials.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a neutron source configured to emit neutrons;
a vessel configured to hold a lithium-containing material, which is a mixture of lithium-sorbent material and a lithium-containing brine; and
a neutron detector configured to:
receive a subset of the neutrons emitted from the neutron source that are transmitted through the lithium-containing material; and
determine a concentration of lithium based on the received subset of neutrons, wherein the determining the concentration of lithium comprises comparing a measured concentration of the mixture of the lithium-sorbent material and the lithium-containing brine in the vessel with a separate measurement of the lithium-containing brine to derive a loading capacity of the lithium-sorbent material in the vessel.

2. The system of claim 1, wherein a relative volume fraction of the lithium-containing brine to a total of the lithium-containing material ranges from 0% to 100%.

3. The system of claim 1, wherein the neutron source, the neutron detector, or both, are movably coupled within the vessel.

4. The system of claim 1, comprising a plurality of adsorption beds comprising the lithium-sorbent material.

5. The system of claim 4, comprising a controller, wherein the controller comprises one or more processors configured to:
generate a lithium extraction output based on the concentration of the lithium; and
adjust an operation associated with the plurality of adsorption beds based on the lithium extraction output.

6. The system of claim 1, comprising a controller configured to control a position of the neutron source, the neutron detector, or both.

7. The system of claim 1, comprising a controller configured to control an intensity corresponding to the neutrons emitted by the neutron source.

8. The system of claim 1, wherein the neutron source, the neutron detector, or both, are disposed on an outer surface of the vessel.

9. A method, comprising:
providing a lithium-containing brine to a vessel holding a lithium-sorbent material;
emitting neutrons into the vessel using a neutron source;
collecting, using a neutron detector, a subset of the emitted neutrons that traverses a collection volume of the vessel, wherein the collection volume is disposed between the neutron source and the neutron detector; and determining a loading capacity of a lithium-containing material based on the collected neutrons, wherein the lithium-containing material comprises the lithium-sorbent material and the lithium-containing brine.

10. The method of claim 9, comprising:
adjusting a position of the neutron source from a first position to a second position different than the first position;
emitting neutrons into the vessel using the neutron source;
creating scattered neutrons and secondary gamma radiation in the lithium-containing material;
collecting a subset of the emitted neutrons and secondary gamma radiation that traverse the collection volume of the vessel using one or more detectors; and
determining the loading capacity of the lithium-sorbent material based on the collected gamma radiation and the collected neutrons.

11. The method of claim 9, comprising removing the lithium-sorbent material from the vessel based on the load capacity.

12. The method of claim 9, comprising outputting an alert indicating a remaining lifetime of the lithium-sorbent material based on the loading capacity.

13. A system, comprising:
one or more adsorption beds configured to receive a lithium-containing stream, wherein each adsorption bed comprises a lithium-sorbent material configured to bind lithium-ions in the lithium-containing stream; and
a lithium detection apparatus, wherein the lithium detection apparatus comprises:
an emission source configured to emit radiation and a detector configured to receive a subset of the emitted radiation from the emission source that is transmitted through the lithium-sorbent material, wherein the radiation comprises neutrons;
one or more detectors configured to receive a subset of the neutrons emitted from the emission source that are transmitted through the lithium-sorbent material and determine a concentration of lithium adsorbed by the lithium-sorbent material based on the received subset of neutrons; and
a controller comprising one or more processors configured to:
receive data from the one or more detectors based on the received subset of neutrons;
determine a concentration of lithium based on the data; and
determine an operational adjustment of the one or more adsorption beds, the lithium detection apparatus, or both, based on the determined concentration.

14. The system of claim 13, wherein the one or more detectors comprise gamma radiation detectors.

15. The system of claim 13, wherein the operational adjustment is configured to remove the lithium-sorbent material from the one or more adsorption beds.

16. The system of claim 13, wherein the operational adjustment is configured to modify a cycle time corresponding to exposure of the lithium-sorbent material to one or more fluids.

17. The system of claim 13, wherein the one or more processors are configured to:
adjust a position of the emission source from a first position to a second position, wherein the data corresponds to the first position; and
determine the concentration based on a ratio the data corresponding to the first position and an additional data set corresponding to the second position.

18. The system of claim 13, wherein the emission source comprise neutron sources, and wherein the one or more detectors comprise neutron detectors.

19. The system of claim 13, wherein the one or more detectors comprise a proportional counter, a scintillator detector, or a combination thereof.

* * * * *